US010833957B2

(12) United States Patent
Chou et al.

(10) Patent No.: US 10,833,957 B2
(45) Date of Patent: Nov. 10, 2020

(54) MANAGING PHYSICAL NETWORK FUNCTION INSTANCES IN A NETWORK SERVICE INSTANCE

(71) Applicant: INTEL CORPORATION, Santa Clara, CA (US)

(72) Inventors: Joey Chou, Scottsdale, AZ (US); Yizhi Yao, Chandler, AZ (US)

(73) Assignee: Intel Corporation, Santa Clara, CA (US)

(*) Notice: Subject to any disclaimer, the term of this patent is extended or adjusted under 35 U.S.C. 154(b) by 44 days.

(21) Appl. No.: 16/247,076

(22) Filed: Jan. 14, 2019

(65) Prior Publication Data
US 2019/0149434 A1 May 16, 2019

Related U.S. Application Data

(60) Provisional application No. 62/617,799, filed on Jan. 16, 2018.

(51) Int. Cl.
H04L 12/28 (2006.01)
H04L 12/24 (2006.01)

(52) U.S. Cl.
CPC ............ H04L 41/50 (2013.01); H04L 41/082 (2013.01); H04L 41/0813 (2013.01)

(58) Field of Classification Search
None
See application file for complete search history.

(56) References Cited

U.S. PATENT DOCUMENTS

| 2016/0269925 | A1* | 9/2016 | Chou | H04W 28/16 |
| 2017/0315844 | A1* | 11/2017 | Ji | H04L 29/02 |
| 2017/0331680 | A1* | 11/2017 | Ji | H04L 12/4641 |
| 2017/0373931 | A1* | 12/2017 | Liu | H04M 15/61 |
| 2018/0270111 | A1* | 9/2018 | Oohira | G06F 9/45558 |
| 2019/0052528 | A1* | 2/2019 | Yoshimura | H04L 43/16 |
| 2019/0073235 | A1* | 3/2019 | Hoshino | G06F 9/45558 |

(Continued)

OTHER PUBLICATIONS

ETSI GS NFV-IFA 013, "Network Function Virtualisation (NFV); Management and Orchestration; Os-Ma-nfvo reference point—Interface and Information Model Specification", V2.1.1, Oct. 2016, 127 pages.

(Continued)

Primary Examiner — Elisabeth Benoit Magloire
(74) Attorney, Agent, or Firm — Alliance IP, LLC

(57) ABSTRACT

Systems and methods provide solutions to add a physical network function (PNF) instance to a network service (NS), modify PNF instances in an NS, and remove PNF instances from an NS. For example, a process may include sending an update NS request from the management function to a network functions virtualization orchestrator (NFVO) to update the NS instance, the update NS request comprising an NS instance identifier, an update type, and PNF information; receiving an update NS response from the NFVO, the update NS response comprising a lifecycle operation occurrence identifier corresponding to an NS lifecycle operation occurrence; receiving an NS Lifecycle Change notification from the NFVO, the NS Lifecycle Change notification indicating a start of an NS update; and receiving an NS identifier change notification from the NFVO, the NS identifier change notification indicating a result of the NS update.

24 Claims, 16 Drawing Sheets

(56) References Cited

U.S. PATENT DOCUMENTS

2019/0327621 A1* 10/2019 Chou .................. H04L 41/0896
2020/0084091 A1* 3/2020 Iovene .................. H04L 41/082

OTHER PUBLICATIONS

ETSI GS NFV-IFA 014, "Network Functions Virtualisation (NFV); Management and Orchestration; Network Service Templates Specification", Oct. 2016, 25 pages.

* cited by examiner

MANAGING PHYSICAL NETWORK FUNCTION INSTANCES IN A NETWORK SERVICE INSTANCE

CROSS-REFERENCE TO RELATED APPLICATIONS

This application claims the benefit of U.S. Provisional Patent Application No. 62/617,799, filed Jan. 16, 2018, which is hereby incorporated by reference herein in its entirety.

TECHNICAL FIELD

This application relates generally to wireless communication systems, and more specifically to managing physical network function (PNF) instances in a network service (NS) instance.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

In some embodiments, systems and methods provide solutions to add a physical network function (PNF) instance to a network service (NS), modify PNF instances in an NS, and remove PNF instances from an NS. For example, a process may include sending an update NS request from the management function to a network functions virtualization orchestrator (NFVO) to update the NS instance, the update NS request comprising an NS instance identifier, an update type, and PNF information; receiving an update NS response from the NFVO, the update NS response comprising a lifecycle operation occurrence identifier corresponding to an NS lifecycle operation occurrence; receiving an NS Lifecycle Change notification from the NFVO, the NS Lifecycle Change notification indicating a start of an NS update; and receiving an NS identifier change notification from the NFVO, the NS identifier change notification indicating a result of the NS update.

Figure 1:
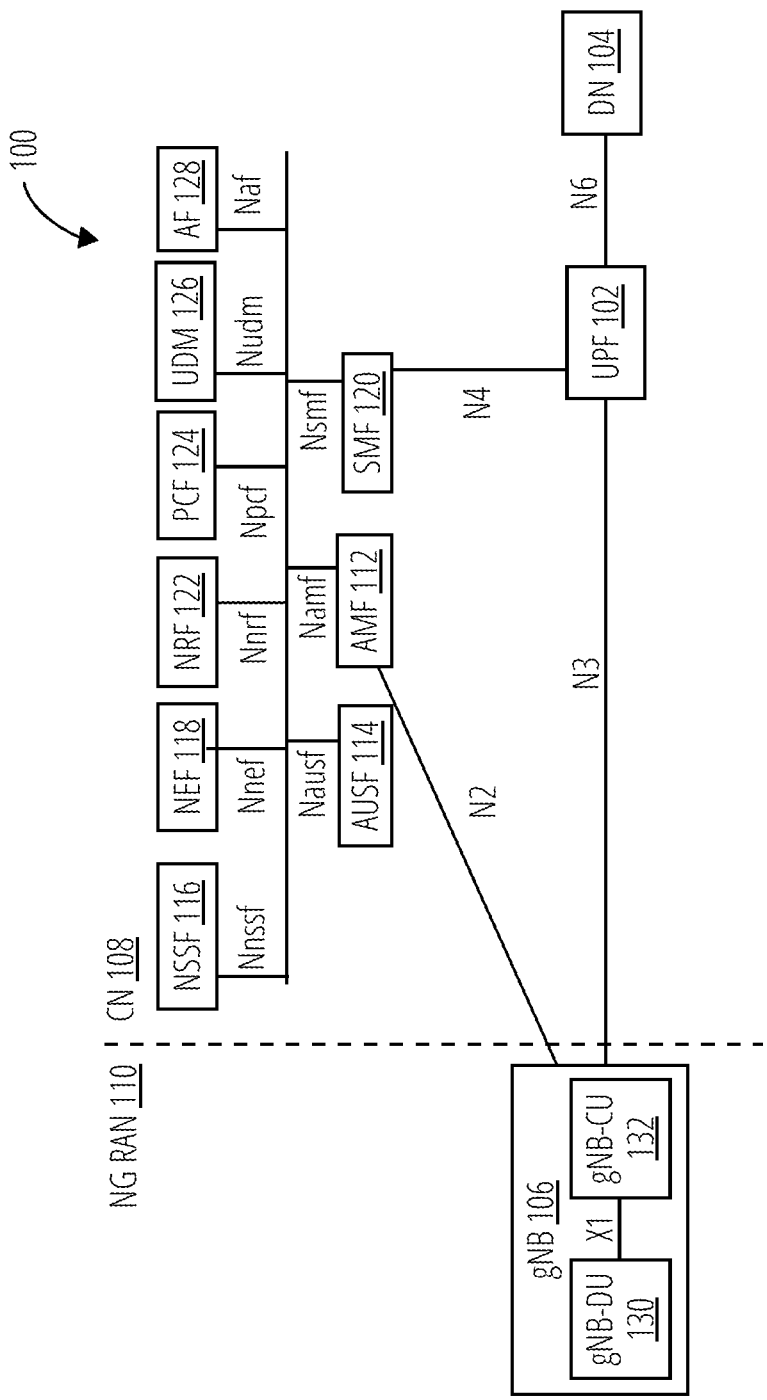
FIG. 1 illustrates an example network architecture in accordance with one embodiment.

FIG. 1 illustrates an architecture of an example network architecture 100 of a network in accordance with some embodiments. The example network architecture 100 is shown to a User Plane Function (shown as UPF 102); a data network (DN 104), which may be, for example, operator services, Internet access or 3rd party services; a gNB 106 (also referred to herein as a RAN node); and a 5G Core network (5GC) (shown as CN 108). Corresponding interfaces or reference points (e.g., N2, N3, N4, N6) are also shown.

The CN 108 may include Network Slice Selection Function (shown as NSSF 116); an Authentication Server Function (AUSF 114); a Core Access and Mobility management function (AMF 112); a Session management function (SMF 120); a network Exposure Function (NEF 118); a Policy Control Function (PCF 124); a network Function (NF) Repository Function (NRF 122); a Unified Data management (UDM 126); and an Application Function (AF 128). The CN 108 may also include other elements that are not shown, such as a Structured Data Storage network function (SDSF), an Unstructured Data Storage network function (UDSF), and the like. Corresponding interfaces or reference points (e.g., Nnssf, Nnef, Nnrf, Npcf, Nudm, Naf, Nausf, Namf, Nsmf) are also shown. Further details of the elements and functions shown in FIG. 1 are provided below, for example, with reference to FIG. 9.

An NR RAN may include a functional split feature that divides or splits functions. For example, the gNB 106 may be split into a gNB-Distributed Unit (shown as gNB-DU 130) and a gNB-Centralized Unit (shown as gNB-CU 132) in communication through an interface X1. The gNB-DU 130 may be configured to implement the lower layer functions of the gNB 106, and the gNB-CU 132 may be configured to implement the upper layer functions of the gNB 106. In certain embodiments, for example, the gNB-CU 132 may be implemented as a VNF deployed in the cloud, and the gNB-DU 130 may be implemented as a PNF in vertical hardware deployed in a cell site to provide wireless communication to UEs.

An operator can create virtualized 5G networks by using an ETSI NFV lifecycle management function to instantiate a network service (NS) in the cloud that includes various VNFs (e.g., 5G core NFs, gNB-CU), PNFs (e.g. gNB-DU), and VNF Forwarding Graph (VNFFG). However, in the lifecycle of mobile network operation, operators may benefit from the capability to expand radio coverage or network capacity, or add a gNB-DU to a mobile network if it currently doesn't have any, by adding PNF(s) to an NS, reduce radio coverage or network capacity by removing PNF(s) from an NS, or redirect the radio coverage to different serving areas or change the PNF behavior by modifying the PNF in an NS. Embodiments herein provide mechanisms to add PNF instances to an NS, modify PNF instances in an NS, and remove PNF instances from an NS.

Figure 2:
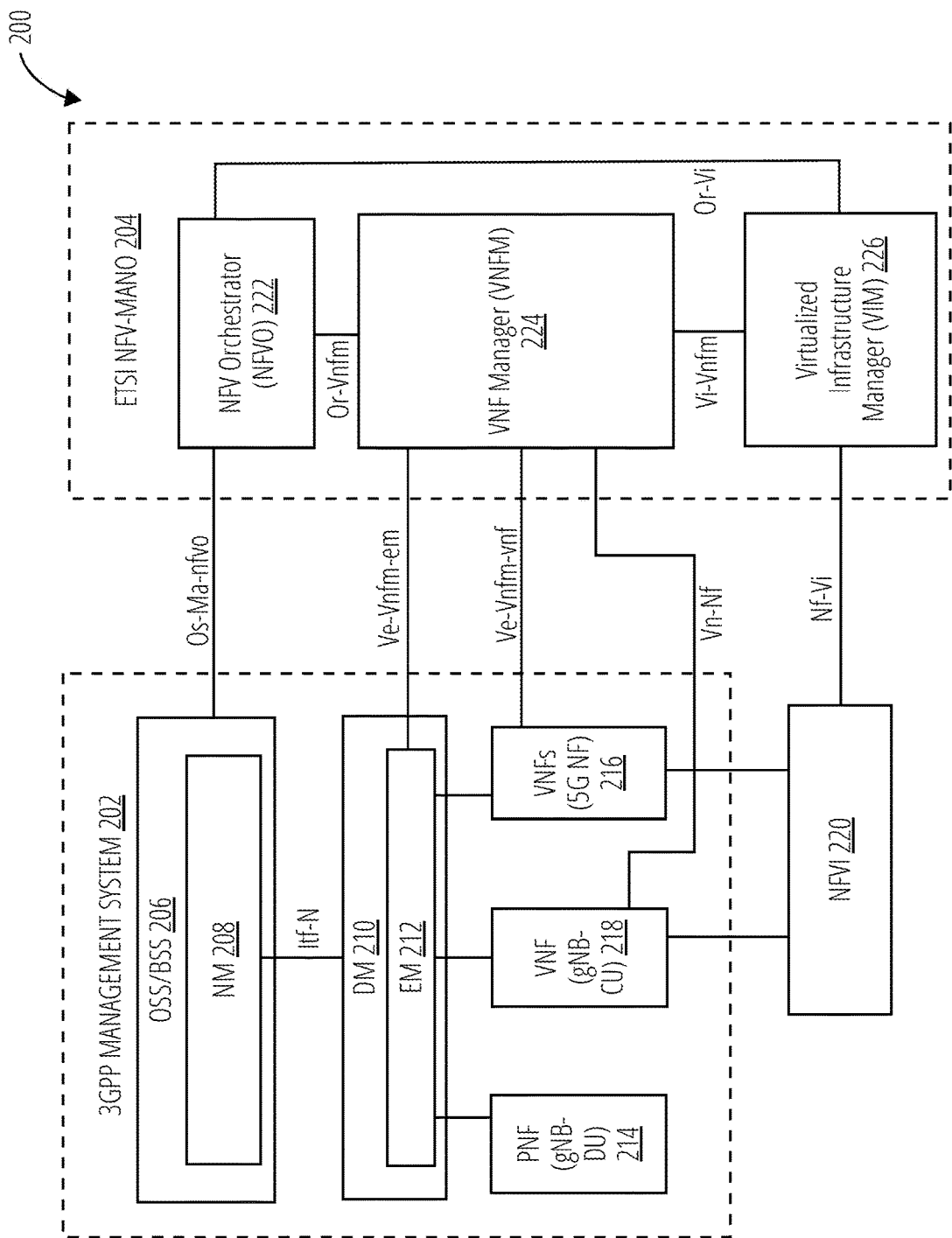
FIG. 2 illustrates an architecture in accordance with one embodiment.

FIG. 2 depicts an example 3GPP management and ETSI NFV management and Orchestration (MANO) architecture 200. The 3GPP management system is based on 4G networks may be subject to change in 5G networks. As used herein, the term "network management function (NMF)" may be an entity that plays a same or similar role as the network manager (NM) in 4G systems. Thus, as a management function may manage a 5G network, an NMF may simply be referred to as a "network management function" herein.

As shown, the architecture 200 of FIG. 2 includes a 3GPP management system 202 comprising an operations support system/business support system (shown as OSS/BSS 206) with an NM 208, a domain manager (shown as DM 210) with an element manager (shown as EM 212), a PNF (gNB-DU) 214, VNFs (5G NF) 216, and a VNF (gNB-CU) 218. The architecture 200 also includes an ETSI NFV-MANO 204 comprising an NFV Orchestrator (NFVO) 222, a VNF Manager (VNFM) 224, and a Virtualized Infrastructure Manager (VIM) 226. The architecture 200 also includes a network functions virtualization infrastructure (shown as NFVI 220). Corresponding interfaces or reference points (Itf-N, Os-Ma-nfvo, Ve-Vnfm-em, Ve-Vnfm-vnf, Vn-Nf, Nf-Vi, Or-Vnfm, Vi-Vnfm, Or-Vi) are also shown. Further details of the elements and functions shown in FIG. 2 are provided below, for example, with reference to FIG. 15.

Figure 3:
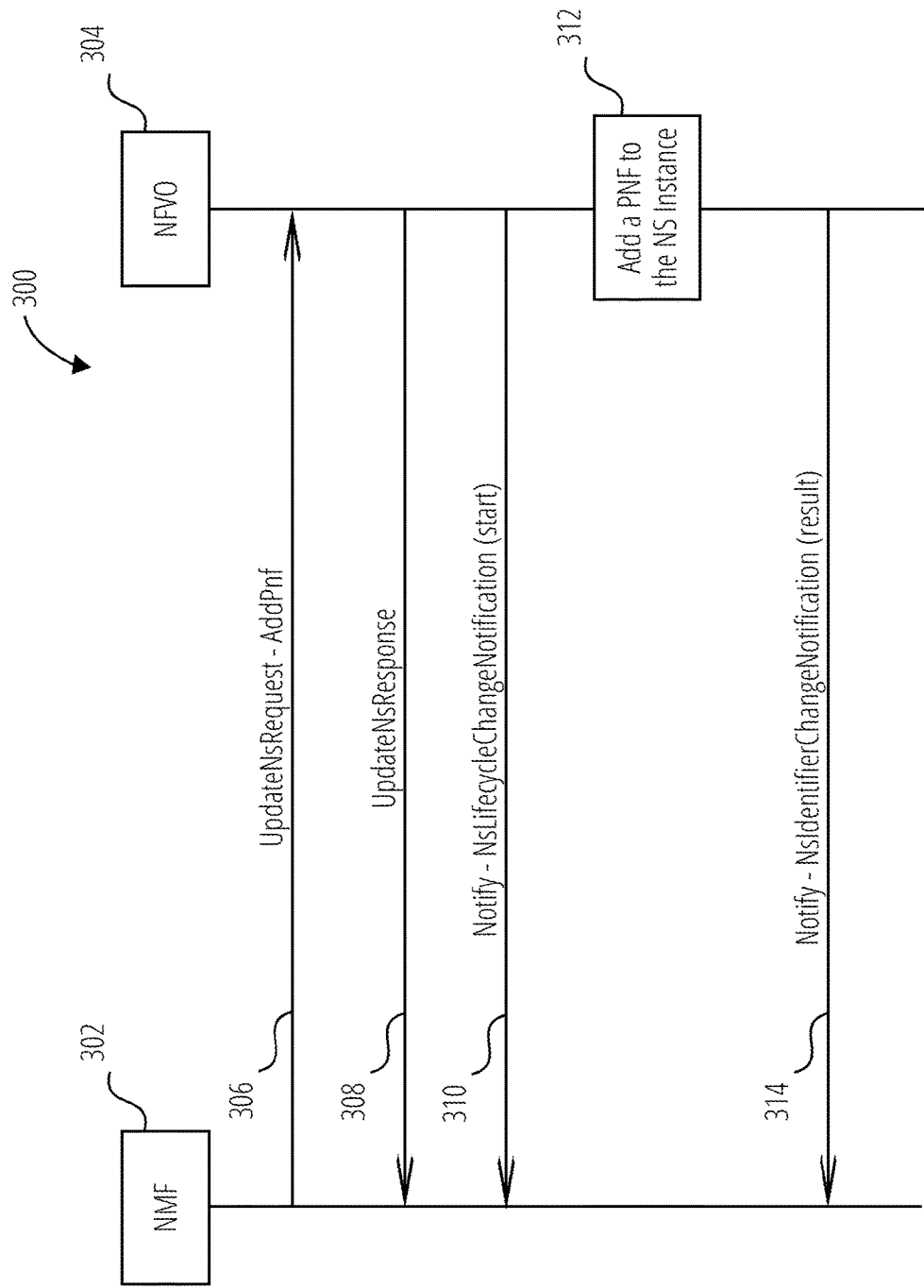
FIG. 3 illustrates a signal diagram in accordance with one embodiment of an NS update to add a PNF to an NS instance.

FIG. 3 illustrates a signal diagram 300 in accordance with one embodiment of an NS update to add a PNF to an NS instance. The signal diagram 300 shows communications between an NMF 302 and an NFVO 304. The NMF 302 may also be referred to herein as a "network management function" or simply "management function." The NMF 302 sends an UpdateNsRequest—AddPnf 306 message to the NFVO 304. In response, the NFVO 304 sends an UpdateNsResponse 308 message and a Notify—NsLifecycleChangeNotification (start) 310 message to the NMF 302. The NFVO 304 performs an operation to add a PNF to the NS instance 312. Then, the NFVO 304 sends a Notify—NsIdentifierChangeNotification (result) 314 message to the NMF 302.

In certain embodiments of the procedure shown in FIG. 3, it is assumed that the PNFD of the PNF instances to be added has been on-boarded, and the NS where the PNF instances are to be added has been instantiated. The UpdateNsRequest—AddPnf 306 message may include one or more of the following parameters to on-board the NSD: nsInstanceId— the identifier of the NS instance being updated; updateType="AddPnf" to indicate the type of update operation; and addPnfData comprising PNF information. The PNF information may include the following attributes: pnfId—the identifier of the PNF; pnfdId—reference to the identifier of the PNFD related to this PNF; pnfProfileId— reference to the identifier of the PNF Profile to be used for this PNF; and cpData—information of the external CP (Connection Point) of the PNF.

The UpdateNsResponse 308 message may include the attribute lifecycleOperationOccurrenceId that is the identifier of the NS lifecycle operation occurrence.

The Notify—NsLifecycleChangeNotification (start) 310 message may carry an NsLifecycleChangeNotification information element with attributes nsInstanceId, lifecycleOperationOccurrenceId, operation="NsUpdate", and notificationType="start" to indicate the start of the NS instantiation. The 304 adds the PNF information provided in addPnfData to the NS instance identified by nsInstanceId.

The Notify—NsIdentifierChangeNotification (result) 314 message carries an NsLifecycleChangeNotification information element with attributes nsInstanceId, lifecycleOperationOccurrenceId, operation="NsUpdate", and notificationType="result" to indicate the end result of the NS instantiation.

An example embodiment of the procedure of FIG. 3 is shown in Table 1.

TABLE 1

| Use Case | Evolution/Specification |
|---|---|
| Goal | To enable NMF to add PNF instance(s) (e.g. gNB-DU) to the NS instance. |

TABLE 1-continued

| Use Case | Evolution/Specification |
| --- | --- |
| Actors and Roles | NMF<br>NFVO |
| Telecom resources | NMF, NFVO |
| Assumptions | NMF is subscribed to receive the NS LCM notifications. |
| Pre-conditions | The PNFD of the PNF instances to be added has been on-boarded.<br>The NS where the PNF instances are to be added has been instantiated. |
| Begins when | Operator decides to to add the PNF instance(s) to the NS. |
| Step 1 (M) | NMF requests NFVO to add the PNF instance(s) to the NS instance. |
| Step 2 (M) | NFVO adds PNF instance(s) to the NS instance. |
| Step 3 (M) | NFVO responds to NMF to indicate the PNF instance(s) have been added successfully to the NS. |
| Ends when | Ends when all steps identified above are completed. |
| Exceptions | One of the steps identified above fails. |
| Post-conditions | The NS contains the PNF instance(s). |
| Traceability | REQ-5GNFV_LCM_Os-Ma-nfvo-FUN-x |

In the example of Table 1, REQ-5GNFV_LCM_Os-Ma-nfvo-FUN-x indicates that the Os-Ma-nfvo reference point supports a capability allowing NMF to request NFVO to add the PNF instance(s) (e.g. gNB-DU) to an NS instance.

Figure 4:
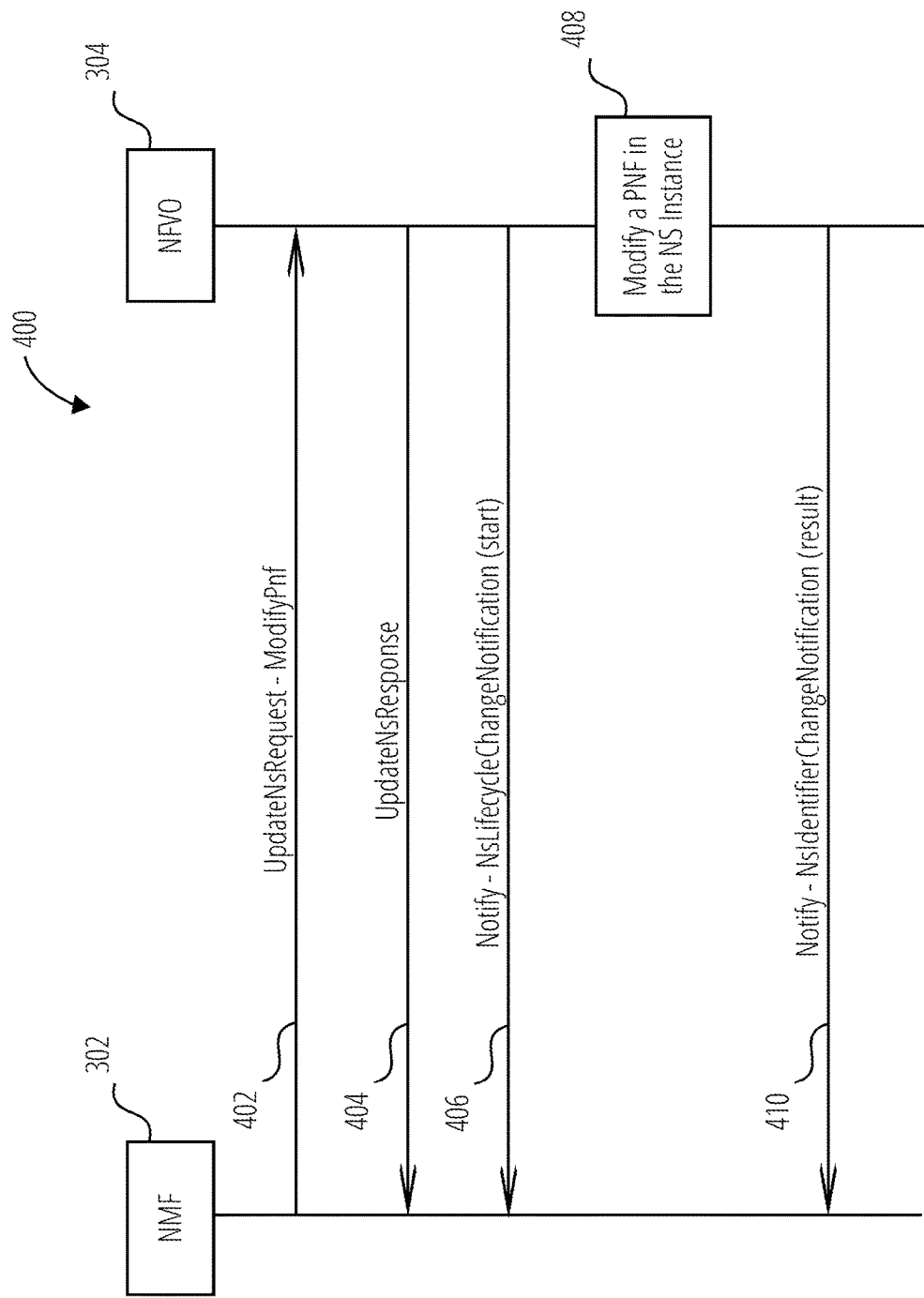
FIG. 4 illustrates a signal diagram in accordance with one embodiment of an NS update to modify a PNF in an NS instance.

FIG. 4 illustrates a signal diagram 400 in accordance with one embodiment of an NS update to modify a PNF in an NS instance. The NMF 302 sends an UpdateNsRequest—ModifyPnf 402 message to the NFVO 304. In response, the NFVO 304 sends an UpdateNsResponse 404 message and a Notify—NsLifecycleChangeNotification (start) 406 message to the NMF 302. The 304 performs an operation to modify a PNF in the NS instance 408. Then, the NFVO 304 sends a Notify—NsIdentifierChangeNotification (result) 410 message to the NMF 302.

In certain embodiments of the procedure shown in FIG. 4, it is assumed that the NS where the PNF instances are to be modified has been instantiated. The UpdateNsRequest—ModifyPnf 402 message may include one or more of the follow parameters: nsInstanceId—the identifier of the NS instance being updated; updateType="ModifyPnf" to indicate the type of update operation; and modifyPnfData comprising PNF information. The PNF information may include one or more of the following attributes pnfId—the identifier of the PNF; and cpData: information of the external CP of the PNF.

The UpdateNsResponse 404 message may include the attribute lifecycleOperationOccurrenceId that is the identifier of the NS lifecycle operation occurrence.

The Notify—NsLifecycleChangeNotification (start) 406 may carry an NsLifecycleChangeNotification information element with attributes nsInstanceId, lifecycleOperationOccurrenceId, operation="NsUpdate", and notificationType="start" to indicate the start of the NS instantiation. The NFVO 304 modifies the NS instance identified by nsInstanceId according to the PNF information provided in modifyPnfData (e.g., modify the external CP of the PNF that is identified by pnfId).

The Notify—NsIdentifierChangeNotification (result) 410 may carry an NsLifecycleChangeNotification information element with attributes nsInstanceId, lifecycleOperationOccurrenceId, operation="NsUpdate", and notificationType="result" to indicate the end result of the NS instantiation.

TABLE 2

| Use Case | Evolution/Specification |
| --- | --- |
| Goal | To enable NMF to modify PNF instances (e.g. change the CP addresses of the gNB-DU) in the NS. |
| Actors and Roles | NMF<br>NFVO |
| Telecom resources | NMF, NFVO |
| Assumptions | NMF is subscribed to receive the NS LCM notifications. |
| Pre-conditions | The NS where the PNF instance is to be modified has been instantiated. |
| Begins when | Operator decides to to modify the PNF instances in the NS. |
| Step 1 (M) | NMF requests NFVO to modify the PNF instance(s) in the NS instance. |
| Step 2 (M) | NFVO modifies the PNF instance(s) in the NS instance. |
| Step 3 (M) | NFVO responds to NMF to indicate that the PNF instance(s) have been modified successfully. |
| Ends when | Ends when all steps identified above are completed. |
| Exceptions | One of the steps identified above fails. |
| Post-conditions | The PNF instance(s) have been modified. |
| Traceability | REQ-5GNFV_LCM_Os-Ma-nfvo-FUN-z |

In the example of Table 2, REQ-5GNFV_LCM_Os-Ma-nfvo-FUN-z indicates that the Os-Ma-nfvo reference point supports a capability allowing NMF to request NFVO to modify the PNF instance(s) (e.g. gNB-DU) from an NS instance.

Figure 5:
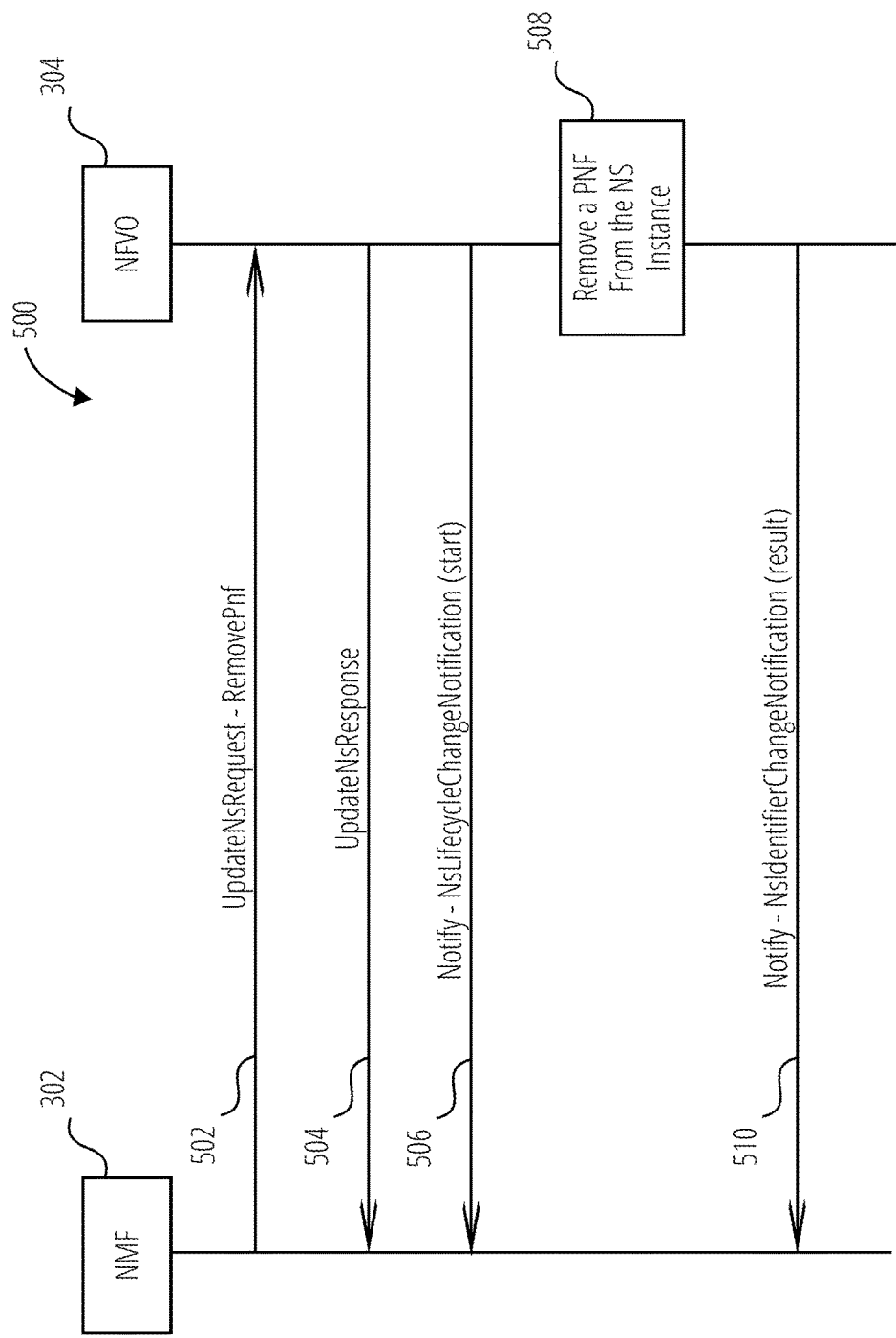
FIG. 5 illustrates a signal diagram in accordance with one embodiment of an NS update to remove a PNF from an NS instance.

FIG. 5 illustrates a signal diagram 500 in accordance with one embodiment of an NS update to remove a PNF from an NS instance. The NMF 302 sends an UpdateNsRequest—RemovePnf 502 message to the NFVO 304. In response, the NFVO 304 sends an UpdateNsResponse 504 message and a Notify—NsLifecycleChangeNotification (start) 506 message to the NMF 302. The 304 performs an operation to remove a PNF from the NS instance 508. Then, the NFVO 304 sends a Notify—NsIdentifierChangeNotification (result) 510 message to the NMF 302.

In certain embodiments of the procedure shown in, it is assumed that the NS where the PNF instances are to be removed has been instantiated. The UpdateNsRequest—RemovePnf 502 message may include one or more of the following parameters: nsInstanceId—the identifier of the NS instance being updated; updateType="RemovePnf" to indicate the type of update operation; and removePnfId—the identifier of the PNF(s) in the NS instance that are to be removed. The UpdateNsResponse 504 message may include the attribute lifecycleOperationOccurrenceId that is the identifier of the NS lifecycle operation occurrence. The Notify—NsLifecycleChangeNotification (start) 506 message may carry an NsLifecycleChangeNotification information element with attributes nsInstanceId, lifecycleOperationOccurrenceId, operation="NsUpdate", and notificationType="start" to indicate the start of the NS instantiation. The NFVO 304 removes the PNF(s) that are identified by removePnfId from the NS instance identified by nsInstanceId. The Notify—NsIdentifierChangeNotification (result) 510 may carry an NsLifecycleChangeNotification information element with attributes nsInstanceId, lifecycleOperationOccurrenceId, operation="NsUpdate", and notificationType="result" to indicate the end result of the NS instantiation.

TABLE 3

| Use Case | Evolution/Specification |
| --- | --- |
| Goal | To enable NMF to remove PNF instances (e.g. gNB-DU) from the NS. |

TABLE 3-continued

| Use Case | Evolution/Specification |
| --- | --- |
| Actors and Roles | NMF<br>NFVO |
| Telecom resources | NMF, NFVO |
| Assumptions | NMF is subscribed to receive the NS LCM notifications. |
| Pre-conditions | The NS where the PNF instances are to be removed has been instantiated. |
| Begins when | Operator decides to to remove PNF instance(s) to the NS. |
| Step 1 (M) | NMF requests NFVO to remove the PNF instance(s) from the NS instance. |
| Step 2 (M) | NFVO removes the PNF instance(s) from the NS instance. |
| Step 3 (M) | NFVO responds to NMF to indicate the gNB-DU PNF instance(s) have been removed successfully. |
| Ends when | Ends when all steps identified above are completed. |
| Exceptions | One of the steps identified above fails. |
| Post-conditions | The PNF instance(s) have been removed from the NS. |
| Traceability | REQ-5GNFV_LCM_Os-Ma-nfvo-FUN-y |

In the example of Table 3, REQ-5GNFV_LCM_Os-Manfvo-FUN-z indicates that the Os-Ma-nfvo reference point supports a capability allowing NMF to request NFVO to remove the PNF instance(s) (e.g. gNB-DU) in the NS.

Figure 6:
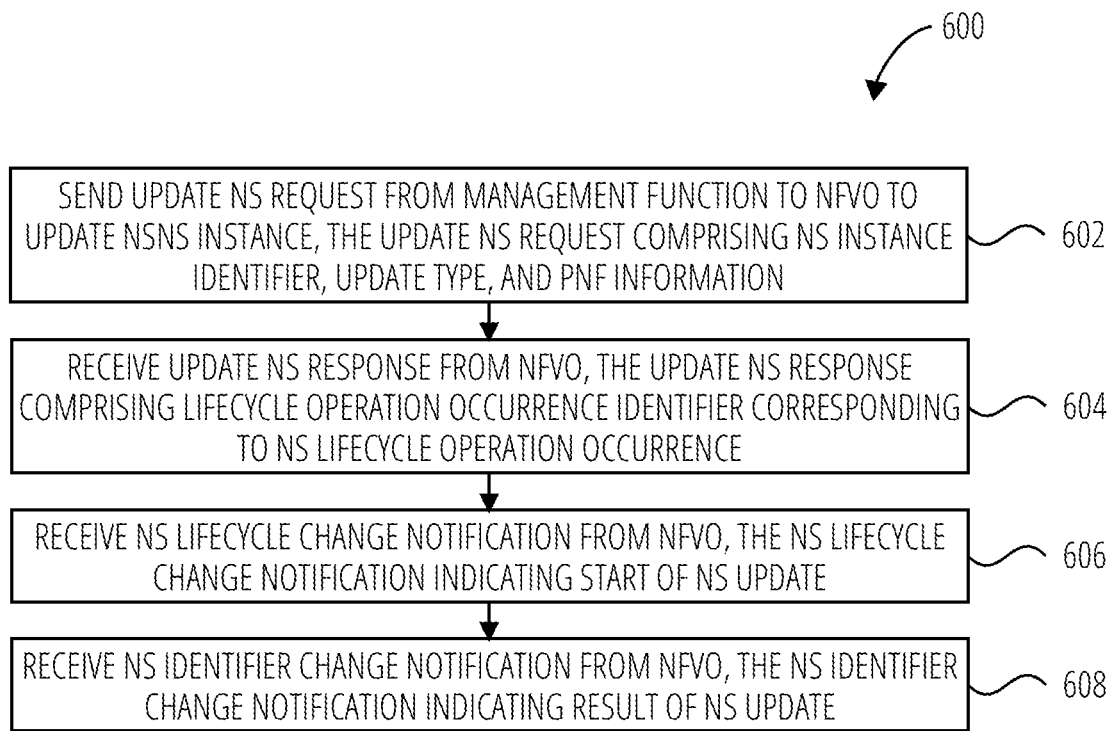
FIG. 6 illustrates a method in accordance with one embodiment for a management function to manage PNF instances in an NS instance.

FIG. 6 illustrates a method 600 in accordance with one embodiment for a management function to manage PNF instances in an NS instance. In block 602, the method 600 sends an update NS request from the management function to a network functions virtualization orchestrator (NFVO) to update the NS instance, the update NS request comprising an NS instance identifier, an update type, and PNF information. In block 604, the method 600 receives an update NS response from the NFVO, the update NS response comprising a lifecycle operation occurrence identifier corresponding to an NS lifecycle operation occurrence. In block 606, the method 600 receives an NS Lifecycle Change notification from the NFVO, the NS Lifecycle Change notification indicating a start of an NS update. In block 608, the method 600 receives an NS identifier change notification from the NFVO, the NS identifier change notification indicating a result of the NS update.

Figure 7:
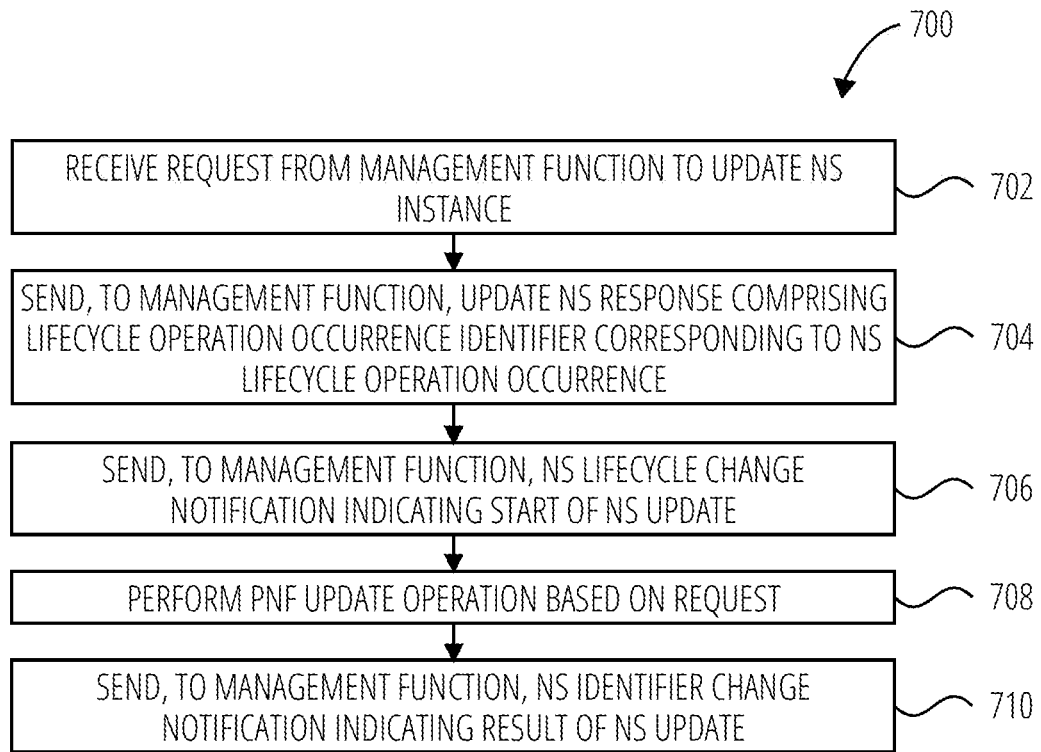
FIG. 7 illustrates a method in accordance with one embodiment for an NFVO to manage PNF instances in an NS instance.

FIG. 7 illustrates a method 600 in accordance with one embodiment for an NFVO to manage PNF instances in an NS instance. In block 702, the method 700 receives a request from a management function to update a network service (NS) instance. In block 704, the method 700 sends, to the management function, an update NS response comprising a lifecycle operation occurrence identifier corresponding to an NS lifecycle operation occurrence. In block 706, the method 700 sends, to the management function, an NS Lifecycle Change notification indicating a start of an NS update. In block 708, the method 700 performs a PNF update operation based on the request. In block 710, the method 700 sends, to the management function, an NS identifier change notification indicating a result of the NS update.

Figure 8:
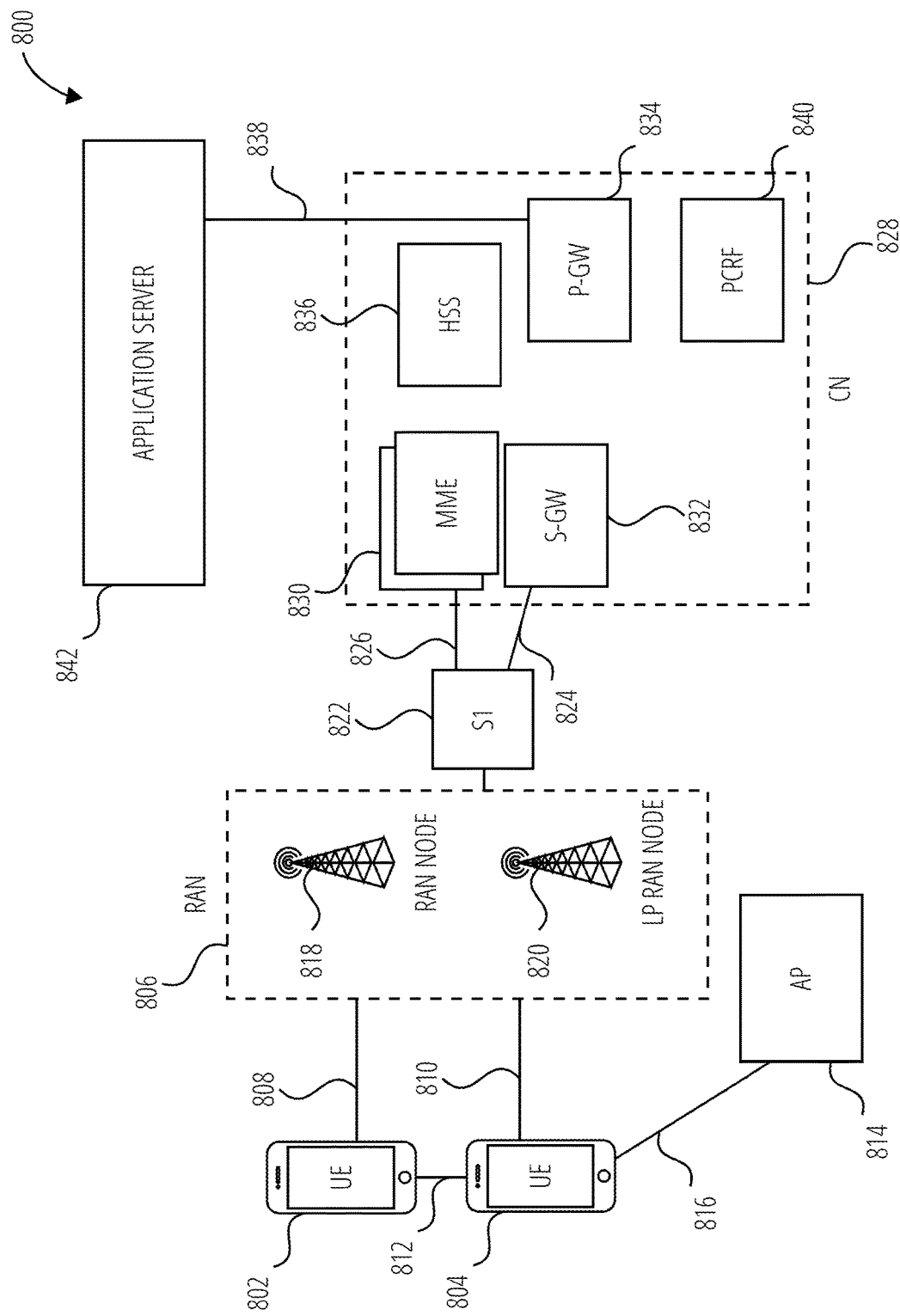
FIG. 8 illustrates a system in accordance with one embodiment.

FIG. 8 illustrates an architecture of a system 800 of a network in accordance with some embodiments. The system 800 includes one or more user equipment (UE), shown in this example as a UE 802 and a UE 804. The UE 802 and the UE 804 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 802 and the UE 804 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 802 and the UE 804 may be configured to connect, e.g., communicatively couple, with a radio access network (RAN), shown as RAN 806. The RAN 806 may be, for example, an Evolved Universal Mobile Telecommunications System (UMTS) Terrestrial Radio Access Network (E-UTRAN), a NextGen RAN (NG RAN), or some other type of RAN. The UE 802 and the UE 804 utilize connection 808 and connection 810, respectively, each of which comprises a physical communications interface or layer (discussed in further detail below); in this example, the connection 808 and the connection 810 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 802 and the UE 804 may further directly exchange communication data via a ProSe interface 812. The ProSe interface 812 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 804 is shown to be configured to access an access point (AP), shown as AP 814, via connection 816. The connection 816 can comprise a local wireless connection, such as a connection consistent with any IEEE 802.11 protocol, wherein the AP 814 would comprise a wireless fidelity (WiFi®) router. In this example, the AP 814 may be connected to the Internet without connecting to the core network of the wireless system (described in further detail below).

The RAN 806 can include one or more access nodes that enable the connection 808 and the connection 810. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 806 may include one or more RAN nodes for providing macrocells, e.g., macro RAN node 818, and one or more RAN nodes for providing femtocells or picocells (e.g., cells having smaller coverage areas, smaller user capacity, or higher bandwidth compared to macrocells), e.g., a low power (LP) RAN node such as LP RAN node 820.

Any of the macro RAN node 818 and the LP RAN node 820 can terminate the air interface protocol and can be the first point of contact for the UE 802 and the UE 804. In some embodiments, any of the macro RAN node 818 and the LP RAN node 820 can fulfill various logical functions for the RAN 806 including, but not limited to, radio network controller (RNC) functions such as radio bearer management, uplink and downlink dynamic radio resource management and data packet scheduling, and mobility management.

In accordance with some embodiments, the UE 802 and the UE 804 can be configured to communicate using Orthogonal Frequency-Division Multiplexing (OFDM) communication signals with each other or with any of the macro RAN node 818 and the LP RAN node 820 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal sub-carriers.

In some embodiments, a downlink resource grid can be used for downlink transmissions from any of the macro RAN node 818 and the LP RAN node 820 to the UE 802 and the UE 804, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 802 and the UE 804. The physical downlink control channel (PDCCH) may carry information about the transport format and resource allocations related to the PDSCH channel, among other things. It may also inform the UE 802 and the UE 804 about the transport format, resource allocation, and H-ARQ (Hybrid Automatic Repeat Request) information related to the uplink shared channel. Typically, downlink scheduling (assigning control and shared channel resource blocks to the UE 804 within a cell) may be performed at any of the macro RAN node 818 and the LP RAN node 820 based on channel quality information fed back from any of the UE 802 and UE 804. The downlink resource assignment information may be sent on the PDCCH used for (e.g., assigned to) each of the UE 802 and the UE 804.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 806 is communicatively coupled to a core network (CN), shown as CN 828—via an S1 interface 822. In embodiments, the CN 828 may be an evolved packet core (EPC) network, a NextGen Packet Core (NPC) network, or some other type of CN. In this embodiment the S1 interface 822 is split into two parts: the S1-U interface 824, which carries traffic data between the macro RAN node 818 and the LP RAN node 820 and a serving gateway (S-GW), shown as S-GW 832, and an S1-mobility management entity (MME) interface, shown as S1-MME interface 826, which is a signaling interface between the macro RAN node 818 and LP RAN node 820 and the MME(s) 830.

In this embodiment, the CN 828 comprises the MME(s) 830, the S-GW 832, a Packet Data Network (PDN) Gateway (P-GW) (shown as P-GW 834), and a home subscriber server (HSS) (shown as HSS 836). The MME(s) 830 may be similar in function to the control plane of legacy Serving General Packet Radio Service (GPRS) Support Nodes (SGSN). The MME(s) 830 may manage mobility aspects in access such as gateway selection and tracking area list management. The HSS 836 may comprise a database for network users, including subscription-related information to support the network entities' handling of communication sessions. The CN 828 may comprise one or several HSS 836, depending on the number of mobile subscribers, on the capacity of the equipment, on the organization of the network, etc. For example, the HSS 836 can provide support for routing/roaming, authentication, authorization, naming/addressing resolution, location dependencies, etc.

The S-GW 832 may terminate the S1 interface 322 towards the RAN 806, and routes data packets between the RAN 806 and the CN 828. In addition, the S-GW 832 may be a local mobility anchor point for inter-RAN node handovers and also may provide an anchor for inter-3GPP mobility. Other responsibilities may include lawful intercept, charging, and some policy enforcement.

The P-GW 834 may terminate an SGi interface toward a PDN. The P-GW 834 may route data packets between the CN 828 (e.g., an EPC network) and external networks such as a network including the application server 842 (alternatively referred to as application function (AF)) via an Internet Protocol (IP) interface (shown as IP communications interface 838). Generally, an application server 842 may be an element offering applications that use IP bearer resources with the core network (e.g., UMTS Packet Services (PS) domain, LTE PS data services, etc.). In this embodiment, the P-GW 834 is shown to be communicatively coupled to an application server 842 via an IP communications interface 838. The application server 842 can also be configured to support one or more communication services (e.g., Voice-over-Internet Protocol (VoIP) sessions, PTT sessions, group communication sessions, social networking services, etc.) for the UE 802 and the UE 804 via the CN 828.

The P-GW 834 may further be a node for policy enforcement and charging data collection. A Policy and Charging Enforcement Function (PCRF) (shown as PCRF 840) is the policy and charging control element of the CN 828. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 840 may be communicatively coupled to the application server 842 via the P-GW 834. The application server 842 may signal the PCRF 840 to indicate a new service flow and select the appropriate Quality of Service (QoS) and charging parameters. The PCRF 840 may provision this rule into a Policy and Charging Enforcement Function (PCEF) (not shown) with the appropriate traffic flow template (TFT) and QoS class of identifier (QCI), which commences the QoS and charging as specified by the application server 842.

Figure 9:
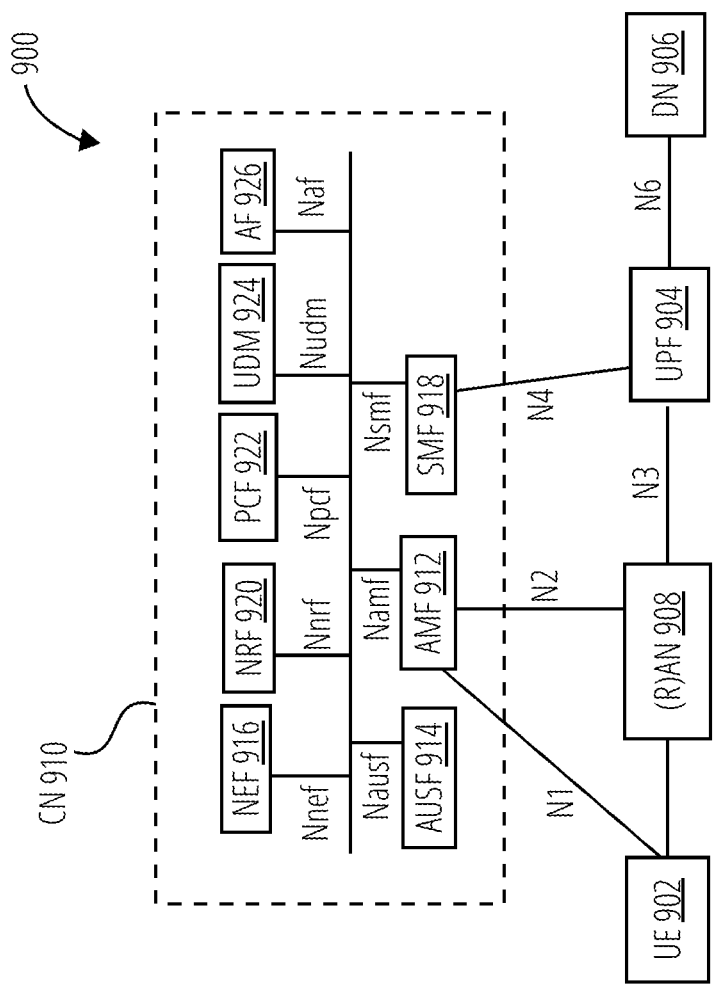
FIG. 9 illustrates a system in accordance with one embodiment.

FIG. 9 illustrates an architecture of a system 900 of a network in accordance with some embodiments. The system 900 is shown to include a UE 902, which may be the same or similar to the UE 802 and the UE 804 discussed previously; a 5G access node or RAN node (shown as (R)AN node 908), which may be the same or similar to the macro RAN node 818 and/or the LP RAN node 820 discussed previously; a User Plane Function (shown as UPF 904); a Data Network (DN 906), which may be, for example, operator services, Internet access or 3rd party services; and a 5G Core Network (5GC) (shown as CN 910).

The CN 910 may include an Authentication Server Function (AUSF 914); a Core Access and Mobility Management Function (AMF 912); a Session Management Function (SMF 918); a Network Exposure Function (NEF 916); a Policy Control Function (PCF 922); a Network Function (NF) Repository Function (NRF 920); a Unified Data Management (UDM 924); and an Application Function (AF 926). The CN 910 may also include other elements that are not shown, such as a Structured Data Storage network function (SDSF), an Unstructured Data Storage network function (UDSF), and the like.

The UPF 904 may act as an anchor point for intra-RAT and inter-RAT mobility, an external PDU session point of interconnect to DN 906, and a branching point to support multi-homed PDU session. The UPF 904 may also perform packet routing and forwarding, packet inspection, enforce user plane part of policy rules, lawfully intercept packets (UP collection); traffic usage reporting, perform QoS handling for user plane (e.g. packet filtering, gating, UL/DL rate enforcement), perform Uplink Traffic verification (e.g., SDF to QoS flow mapping), transport level packet marking in the uplink and downlink, and downlink packet buffering and downlink data notification triggering. UPF 904 may include an uplink classifier to support routing traffic flows to a data network. The DN 906 may represent various network operator services, Internet access, or third party services. DN 906 may include, or be similar to the application server 842 discussed previously.

The AUSF 914 may store data for authentication of UE 902 and handle authentication related functionality. The AUSF 914 may facilitate a common authentication framework for various access types.

The AMF 912 may be responsible for registration management (e.g., for registering UE 902, etc.), connection management, reachability management, mobility management, and lawful interception of AMF-related events, and access authentication and authorization. AMF 912 may provide transport for SM messages for the SMF 918, and act as a transparent proxy for routing SM messages. AMF 912 may also provide transport for short message service (SMS) messages between UE 902 and an SMS function (SMSF) (not shown by FIG. 9). AMF 912 may act as Security Anchor Function (SEA), which may include interaction with the AUSF 914 and the UE 902, receipt of an intermediate key that was established as a result of the UE 902 authentication process. Where USIM based authentication is used, the AMF 912 may retrieve the security material from the AUSF 914. AMF 912 may also include a Security Context Management (SCM) function, which receives a key from the SEA that it uses to derive access-network specific keys. Furthermore, AMF 912 may be a termination point of RAN CP interface (N2 reference point), a termination point of NAS (NI) signaling, and perform NAS ciphering and integrity protection.

AMF 912 may also support NAS signaling with a UE 902 over an N3 interworking-function (IWF) interface. The N3IWF may be used to provide access to untrustedentities. N3IWF may be a termination point for the N2 and N3 interfaces for control plane and user plane, respectively, and as such, may handle N2 signaling from SMF and AMF for PDU sessions and QoS, encapsulate/de-encapsulate packets for IPSec and N3 tunneling, mark N3 user-plane packets in the uplink, and enforce QoS corresponding to N3 packet marking taking into account QoS requirements associated to such marking received over N2. N3IWF may also relay uplink and downlink control☐plane NAS (NI) signaling between the UE 902 and AMF 912, and relay uplink and downlink user-plane packets between the UE 902 and UPF 904. The N3IWF also provides mechanisms for IPsec tunnel establishment with the UE 902.

The SMF 918 may be responsible for session management (e.g., session establishment, modify and release, including tunnel maintain between UPF and AN node); UE IP address allocation & management (including optional Authorization); Selection and control of UP function; Configures traffic steering at UPF to route traffic to proper destination; termination of interfaces towards Policy control functions; control part of policy enforcement and QoS; lawful intercept (for SM events and interface to LI System); termination of SM parts of NAS messages; downlink Data Notification; initiator of AN specific SM information, sent via AMF over N2 to AN; determine SSC mode of a session. The SMF 918 may include the following roaming functionality: handle local enforcement to apply QoS SLAB (VPLMN); charging data collection and charging interface (VPLMN); lawful intercept (in VPLMN for SM events and interface to LI System); support for interaction with external DN for transport of signaling for PDU session authorization/authentication by external DN.

The NEF 916 may provide means for securely exposing the services and capabilities provided by 3GPP network functions for third party, internal exposure/re-exposure, Application Functions (e.g., AF 926), edge computing or fog computing systems, etc. In such embodiments, the NEF 916 may authenticate, authorize, and/or throttle the AFs. NEF 916 may also translate information exchanged with the AF 926 and information exchanged with internal network functions. For example, the NEF 916 may translate between an AF-Service-Identifier and an internal 5GC information. NEF 916 may also receive information from other network functions (NFs) based on exposed capabilities of other network functions. This information may be stored at the NEF 916 as structured data, or at a data storage NF using a standardized interfaces. The stored information can then be re-exposed by the NEF 916 to other NFs and AFs, and/or used for other purposes such as analytics.

The NRF 920 may support service discovery functions, receive NF Discovery Requests from NF instances, and provide the information of the discovered NF instances to the NF instances. NRF 920 also maintains information of available NF instances and their supported services.

The PCF 922 may provide policy rules to control plane function(s) to enforce them, and may also support unified policy framework to govern network behavior. The PCF 922 may also implement a front end (FE) to access subscription information relevant for policy decisions in a UDR of UDM 924.

The UDM 924 may handle subscription-related information to support the network entities' handling of communication sessions, and may store subscription data of UE 902. The UDM 924 may include two parts, an application FE and a User Data Repository (UDR). The UDM may include a UDM FE, which is in charge of processing of credentials, location management, subscription management and so on. Several different front ends may serve the same user in different transactions. The UDM-FE accesses subscription information stored in the UDR and performs authentication credential processing; user identification handling; access authorization; registration/mobility management; and subscription management. The UDR may interact with PCF 922. UDM 924 may also support SMS management, wherein an SMS-FE implements the similar application logic as discussed previously.

The AF 926 may provide application influence on traffic routing, access to the Network Capability Exposure (NCE), and interact with the policy framework for policy control. The NCE may be a mechanism that allows the 5GC and AF 926 to provide information to each other via NEF 916, which may be used for edge computing implementations. In such implementations, the network operator and third party services may be hosted close to the UE 902 access point of attachment to achieve an efficient service delivery through the reduced end-to-end latency and load on the transport network. For edge computing implementations, the 5GC may select a UPF 904 close to the UE 902 and execute traffic steering from the UPF 904 to DN 906 via the N6 interface. This may be based on the UE subscription data, UE location, and information provided by the AF 926. In this way, the AF 926 may influence UPF (re)selection and traffic routing. Based on operator deployment, when AF 926 is considered to be a trusted entity, the network operator may permit AF 926 to interact directly with relevant NFs.

As discussed previously, the CN 910 may include an SMSF, which may be responsible for SMS subscription checking and verification, and relaying SM messages to/from the UE 902 to/from other entities, such as an SMS☐GMSC/IWMSC/SMS-router. The SMS may also interact with AMF 912 and UDM 924 for notification procedure that the UE 902 is available for SMS transfer (e.g., set a UE not reachable flag, and notifying UDM 924 when UE 902 is available for SMS).

The system 900 may include the following service-based interfaces: Namf: Service-based interface exhibited by AMF; Nsmf: Service-based interface exhibited by SMF; Nnef: Service-based interface exhibited by NEF; Npcf: Service☐based interface exhibited by PCF; Nudm: Service-based interface exhibited by UDM; Naf: Service-based interface exhibited by AF; Nnrf: Service-based interface exhibited by NRF; and Nausf: Service-based interface exhibited by AUSF.

The system 900 may include the following reference points: N1: Reference point between the UE and the AMF; N2: Reference point between the (R)AN and the AMF; N3: Reference point between the (R)AN and the UPF; N4: Reference point between the SMF and the UPF; and N6: Reference point between the UPF and a Data Network. There may be many more reference points and/or service-based interfaces between the NF services in the NFs, however, these interfaces and reference points have been omitted for clarity. For example, an NS reference point may be between the PCF and the AF; an N7 reference point may be between the PCF and the SMF; an N11 reference point between the AMF and SMF; etc. In some embodiments, the CN 910 may include an Nx interface, which is an inter-CN interface between the MME (e.g., MME(s) 830) and the AMF 912 in order to enable interworking between CN 910 and CN 828.

Although not shown by FIG. 9, the system 900 may include multiple RAN nodes (such as (R)AN node 908) wherein an Xn interface is defined between two or more (R)AN node 908 (e.g., gNBs and the like) that connecting to 5GC 410, between a (R)AN node 908 (e.g., gNB) connecting to CN 910 and an eNB (e.g., a macro RAN node 818 of FIG. 8), and/or between two eNBs connecting to CN 910.

In some implementations, the Xn interface may include an Xn user plane (Xn☐U) interface and an Xn control plane (Xn-C) interface. The Xn-U may provide non☐guaranteed delivery of user plane PDUs and support/provide data forwarding and flow control functionality. The Xn-C may provide management and error handling functionality, functionality to manage the Xn-C interface; mobility support for UE 902 in a connected mode (e.g., CM-CONNECTED) including functionality to manage the UE mobility for connected mode between one or more (R)AN node 908. The mobility support may include context transfer from an old (source) serving (R)AN node 908 to new (target) serving (R)AN node 908; and control of user plane tunnels between old (source) serving (R)AN node 908 to new (target) serving (R)AN node 908.

A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on an SCTP layer. The SCTP layer may be on top of an IP layer. The SCTP layer provides the guaranteed delivery of application layer messages. In the transport IP layer point-to-point transmission is used to deliver the signaling PDUs. In other implementations, the Xn-U protocol stack and/or the Xn-C protocol stack may be same or similar to the user plane and/or control plane protocol stack(s) shown and described herein.

Figure 10:
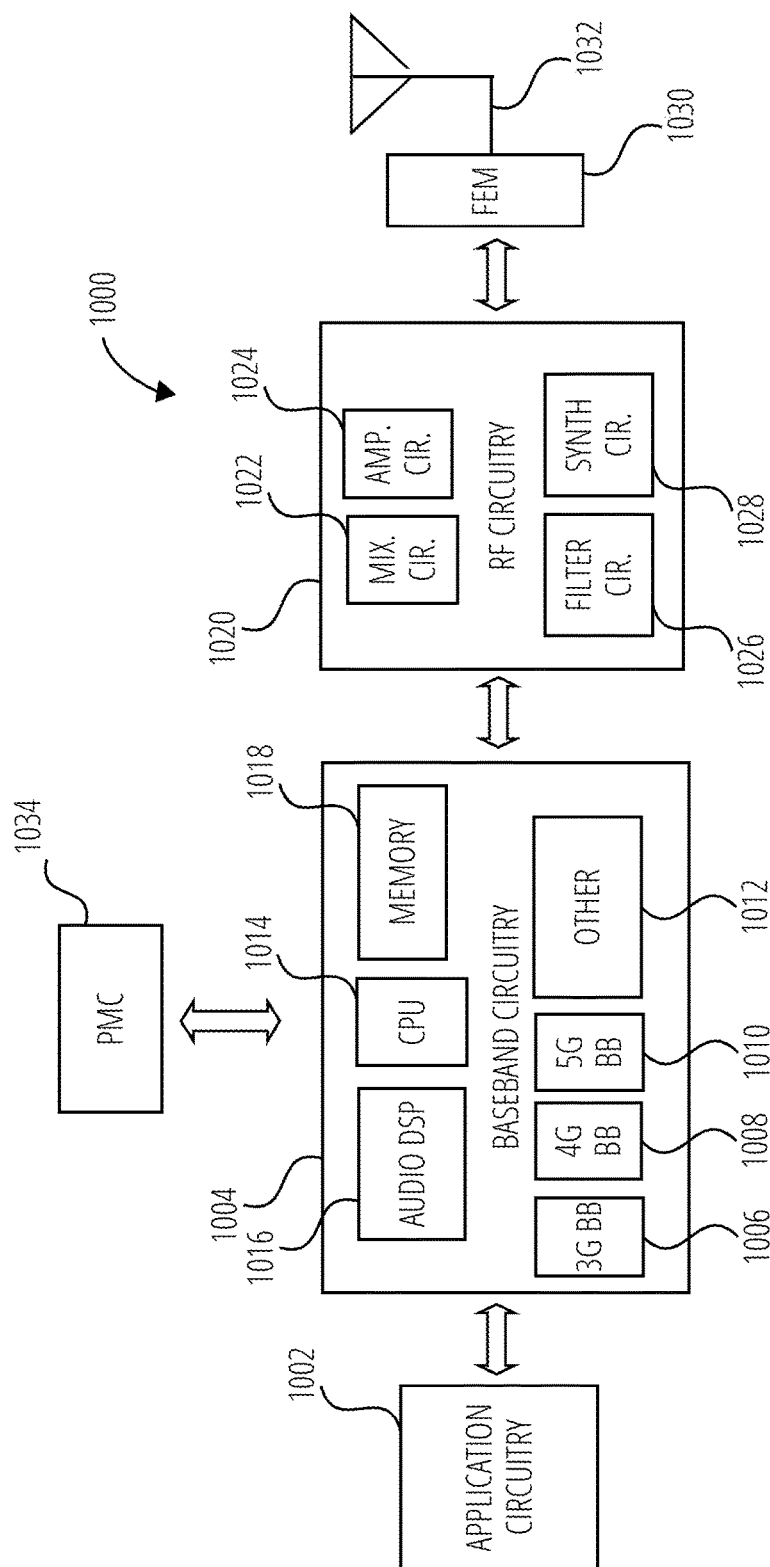
FIG. 10 illustrates a device in accordance with one embodiment.

FIG. 10 illustrates example components of a device 1000 in accordance with some embodiments. In some embodiments, the device 1000 may include application circuitry 1002, baseband circuitry 1004, Radio Frequency (RF) circuitry (shown as RF circuitry 1020), front-end module (FEM) circuitry (shown as FEM circuitry 1030), one or more antennas 1032, and power management circuitry (PMC) (shown as PMC 1034) coupled together at least as shown. The components of the illustrated device 1000 may be included in a UE or a RAN node. In some embodiments, the device 1000 may include fewer elements (e.g., a RAN node may not utilize application circuitry 1002, and instead include a processor/controller to process IP data received from an EPC). In some embodiments, the device 1000 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1002 may include one or more application processors. For example, the application circuitry 1002 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1000. In some embodiments, processors of application circuitry 1002 may process IP data packets received from an EPC.

The baseband circuitry 1004 may include circuitry such as, but not limited to, one or more single-core or multi-core processors. The baseband circuitry 1004 may include one or more baseband processors or control logic to process baseband signals received from a receive signal path of the RF circuitry 1020 and to generate baseband signals for a transmit signal path of the RF circuitry 1020. The baseband circuitry 1004 may interface with the application circuitry 1002 for generation and processing of the baseband signals and for controlling operations of the RF circuitry 1020. For example, in some embodiments, the baseband circuitry 1004 may include a third generation (3G) baseband processor (3G baseband processor 1006), a fourth generation (4G) baseband processor (4G baseband processor 1008), a fifth generation (5G) baseband processor (5G baseband processor 1010), or other baseband processor(s) 1012 for other existing generations, generations in development or to be developed in the future (e.g., second generation (2G), sixth generation (6G), etc.). The baseband circuitry 1004 (e.g., one or more of baseband processors) may handle various radio control functions that enable communication with one or more radio networks via the RF circuitry 1020. In other embodiments, some or all of the functionality of the illustrated baseband processors may be included in modules stored in the memory 1018 and executed via a Central Processing Unit (CPU 1014). The radio control functions may include, but are not limited to, signal modulation/demodulation, encoding/decoding, radio frequency shifting, etc. In some embodiments, modulation/demodulation circuitry of the baseband circuitry 1004 may include Fast-Fourier Transform (FFT), precoding, or constellation mapping/demapping functionality. In some embodiments, encoding/decoding circuitry of the baseband circuitry 1004 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1004 may include a digital signal processor (DSP), such as one or more audio DSP(s) 1016. The one or more audio DSP(s) 1016 may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1004 and the application circuitry 1002 may be implemented together such as, for example, on a system on a chip (SOC).

In some embodiments, the baseband circuitry 1004 may provide for communication compatible with one or more radio technologies. For example, in some embodiments, the baseband circuitry 1004 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 1004 is configured to support radio communications of more than one wireless protocol may be referred to as multi-mode baseband circuitry.

The RF circuitry 1020 may enable communication with wireless networks using modulated electromagnetic radiation through a non-solid medium. In various embodiments, the RF circuitry 1020 may include switches, filters, amplifiers, etc. to facilitate the communication with the wireless network. The RF circuitry 1020 may include a receive signal path which may include circuitry to down-convert RF signals received from the FEM circuitry 1030 and provide baseband signals to the baseband circuitry 1004. The RF circuitry 1020 may also include a transmit signal path which may include circuitry to up-convert baseband signals provided by the baseband circuitry 1004 and provide RF output signals to the FEM circuitry 1030 for transmission.

In some embodiments, the receive signal path of the RF circuitry 1020 may include mixer circuitry 1022, amplifier circuitry 1024 and filter circuitry 1026. In some embodiments, the transmit signal path of the RF circuitry 1020 may include filter circuitry 1026 and mixer circuitry 1022. The RF circuitry 1020 may also include synthesizer circuitry 1028 for synthesizing a frequency for use by the mixer circuitry 1022 of the receive signal path and the transmit signal path. In some embodiments, the mixer circuitry 1022 of the receive signal path may be configured to down-convert RF signals received from the FEM circuitry 1030 based on the synthesized frequency provided by synthesizer circuitry 1028. The amplifier circuitry 1024 may be configured to amplify the down-converted signals and the filter circuitry 1026 may be a low-pass filter (LPF) or band-pass filter (BPF) configured to remove unwanted signals from the down-converted signals to generate output baseband signals. Output baseband signals may be provided to the baseband circuitry 1004 for further processing. In some embodiments, the output baseband signals may be zero-frequency baseband signals, although this is not a requirement. In some embodiments, the mixer circuitry 1022 of the receive signal path may comprise passive mixers, although the scope of the embodiments is not limited in this respect.

In some embodiments, the mixer circuitry 1022 of the transmit signal path may be configured to up-convert input baseband signals based on the synthesized frequency provided by the synthesizer circuitry 1028 to generate RF output signals for the FEM circuitry 1030. The baseband signals may be provided by the baseband circuitry 1004 and may be filtered by the filter circuitry 1026.

In some embodiments, the mixer circuitry 1022 of the receive signal path and the mixer circuitry 1022 of the transmit signal path may include two or more mixers and may be arranged for quadrature downconversion and upconversion, respectively. In some embodiments, the mixer circuitry 1022 of the receive signal path and the mixer circuitry 1022 of the transmit signal path may include two or more mixers and may be arranged for image rejection (e.g., Hartley image rejection). In some embodiments, the mixer circuitry 1022 of the receive signal path and the mixer circuitry 1022 may be arranged for direct downconversion and direct upconversion, respectively. In some embodiments, the mixer circuitry 1022 of the receive signal path and the mixer circuitry 1022 of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1020 may include analog-to-digital converter (ADC) and digital-to-analog converter (DAC) circuitry and the baseband circuitry 1004 may include a digital baseband interface to communicate with the RF circuitry 1020.

In some dual-mode embodiments, a separate radio IC circuitry may be provided for processing signals for each spectrum, although the scope of the embodiments is not limited in this respect.

In some embodiments, the synthesizer circuitry 1028 may be a fractional-N synthesizer or a fractional N/N+1 synthesizer, although the scope of the embodiments is not limited in this respect as other types of frequency synthesizers may be suitable. For example, synthesizer circuitry 1028 may be a delta-sigma synthesizer, a frequency multiplier, or a synthesizer comprising a phase-locked loop with a frequency divider.

The synthesizer circuitry 1028 may be configured to synthesize an output frequency for use by the mixer circuitry 1022 of the RF circuitry 1020 based on a frequency input and a divider control input. In some embodiments, the synthesizer circuitry 1028 may be a fractional N/N+1 synthesizer.

In some embodiments, frequency input may be provided by a voltage controlled oscillator (VCO), although that is not a requirement. Divider control input may be provided by either the baseband circuitry 1004 or the application circuitry 1002 (such as an applications processor) depending on the desired output frequency. In some embodiments, a divider control input (e.g., N) may be determined from a look-up table based on a channel indicated by the application circuitry 1002.

Synthesizer circuitry 1028 of the RF circuitry 1020 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 1028 may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1020 may include an IQ/polar converter.

The FEM circuitry 1030 may include a receive signal path which may include circuitry configured to operate on RF signals received from one or more antennas 1032, amplify the received signals and provide the amplified versions of the received signals to the RF circuitry 1020 for further processing. The FEM circuitry 1030 may also include a transmit signal path which may include circuitry configured to amplify signals for transmission provided by the RF circuitry 1020 for transmission by one or more of the one or more antennas 1032. In various embodiments, the amplification through the transmit or receive signal paths may be done solely in the RF circuitry 1020, solely in the FEM circuitry 1030, or in both the RF circuitry 1020 and the FEM circuitry 1030.

In some embodiments, the FEM circuitry 1030 may include a TX/RX switch to switch between transmit mode and receive mode operation. The FEM circuitry 1030 may include a receive signal path and a transmit signal path. The receive signal path of the FEM circuitry 1030 may include an LNA to amplify received RF signals and provide the amplified received RF signals as an output (e.g., to the RF circuitry 1020). The transmit signal path of the FEM circuitry 1030 may include a power amplifier (PA) to amplify input RF signals (e.g., provided by the RF circuitry 1020), and one or more filters to generate RF signals for subsequent transmission (e.g., by one or more of the one or more antennas 1032).

In some embodiments, the PMC 1034 may manage power provided to the baseband circuitry 1004. In particular, the PMC 1034 may control power-source selection, voltage scaling, battery charging, or DC-to-DC conversion. The PMC 1034 may often be included when the device 1000 is capable of being powered by a battery, for example, when the device 1000 is included in a UE. The PMC 1034 may increase the power conversion efficiency while providing desirable implementation size and heat dissipation characteristics.

FIG. 10 shows the PMC 1034 coupled only with the baseband circuitry 1004. However, in other embodiments, the PMC 1034 may be additionally or alternatively coupled with, and perform similar power management operations for, other components such as, but not limited to, the application circuitry 1002, the RF circuitry 1020, or the FEM circuitry 1030.

In some embodiments, the PMC 1034 may control, or otherwise be part of, various power saving mechanisms of the device 1000. For example, if the device 1000 is in an RRC_Connected state, where it is still connected to the RAN node as it expects to receive traffic shortly, then it may enter a state known as Discontinuous Reception Mode (DRX)

after a period of inactivity. During this state, the device 1000 may power down for brief intervals of time and thus save power.

If there is no data traffic activity for an extended period of time, then the device 1000 may transition off to an RRC_Idle state, where it disconnects from the network and does not perform operations such as channel quality feedback, handover, etc. The device 1000 goes into a very low power state and it performs paging where again it periodically wakes up to listen to the network and then powers down again. The device 1000 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1002 and processors of the baseband circuitry 1004 may be used to execute elements of one or more instances of a protocol stack. For example, processors of the baseband circuitry 1004, alone or in combination, may be used to execute Layer 3, Layer 2, or Layer 1 functionality, while processors of the application circuitry 1002 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 11:
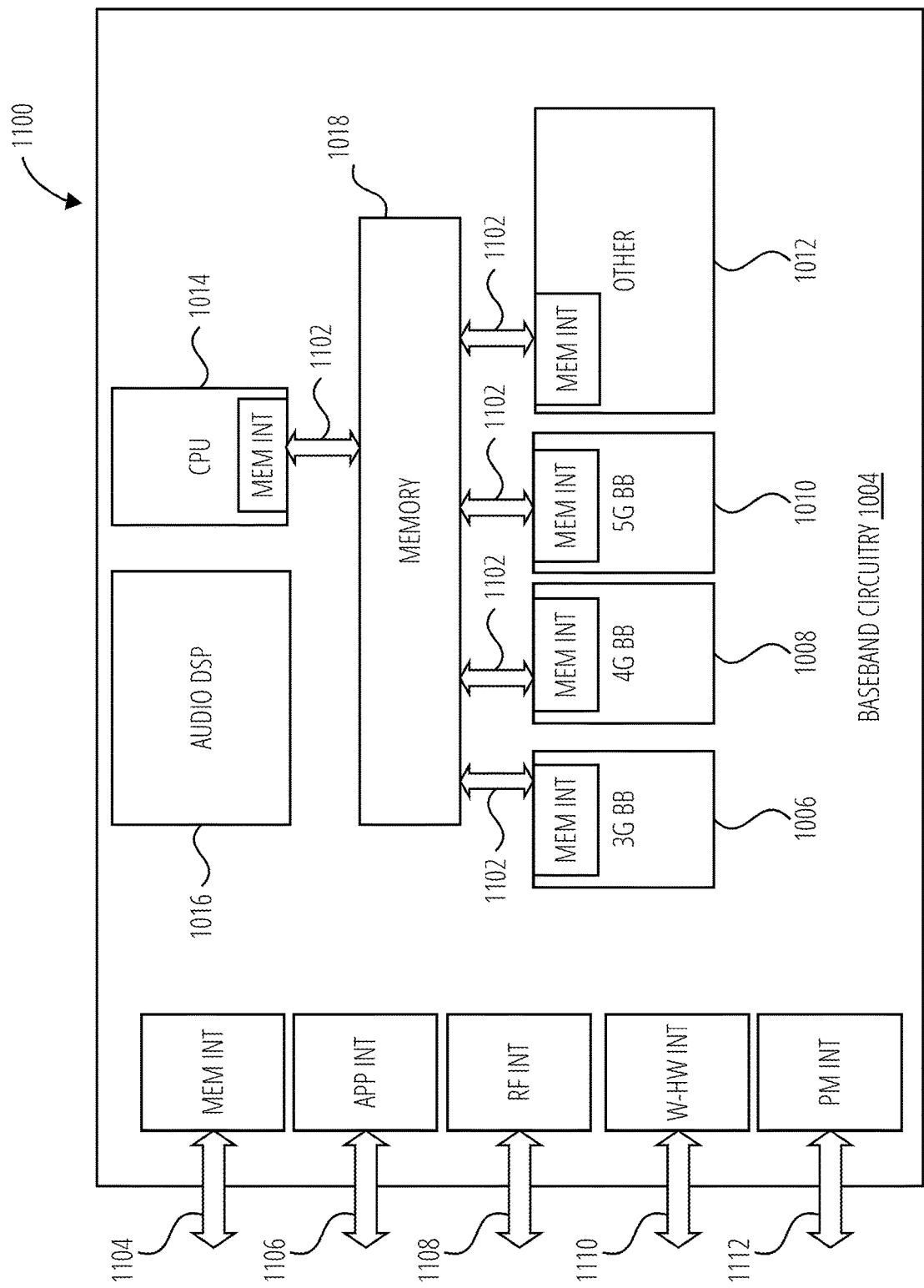
FIG. 11 illustrates an example interfaces in accordance with one embodiment.

FIG. 11 illustrates example interfaces 1100 of baseband circuitry in accordance with some embodiments. As discussed above, the baseband circuitry 1004 of FIG. 10 may comprise 3G baseband processor 1006, 4G baseband processor 1008, 5G baseband processor 1010, other baseband processor(s) 1012, CPU 1014, and a memory 1018 utilized by said processors. As illustrated, each of the processors may include a respective memory interface 1102 to send/receive data to/from the memory 1018.

The baseband circuitry 1004 may further include one or more interfaces to communicatively couple to other circuitries/devices, such as a memory interface 1104 (e.g., an interface to send/receive data to/from memory external to the baseband circuitry 1004), an application circuitry interface 1106 (e.g., an interface to send/receive data to/from the application circuitry 1002 of FIG. 10), an RF circuitry interface 1108 (e.g., an interface to send/receive data to/from RF circuitry 1020 of FIG. 10), a wireless hardware connectivity interface 1110 (e.g., an interface to send/receive data to/from Near Field Communication (NFC) components, Bluetooth® components (e.g., Bluetooth® Low Energy), Wi-Fi® components, and other communication components), and a power management interface 1112 (e.g., an interface to send/receive power or control signals to/from the PMC 1034.

Figure 12:
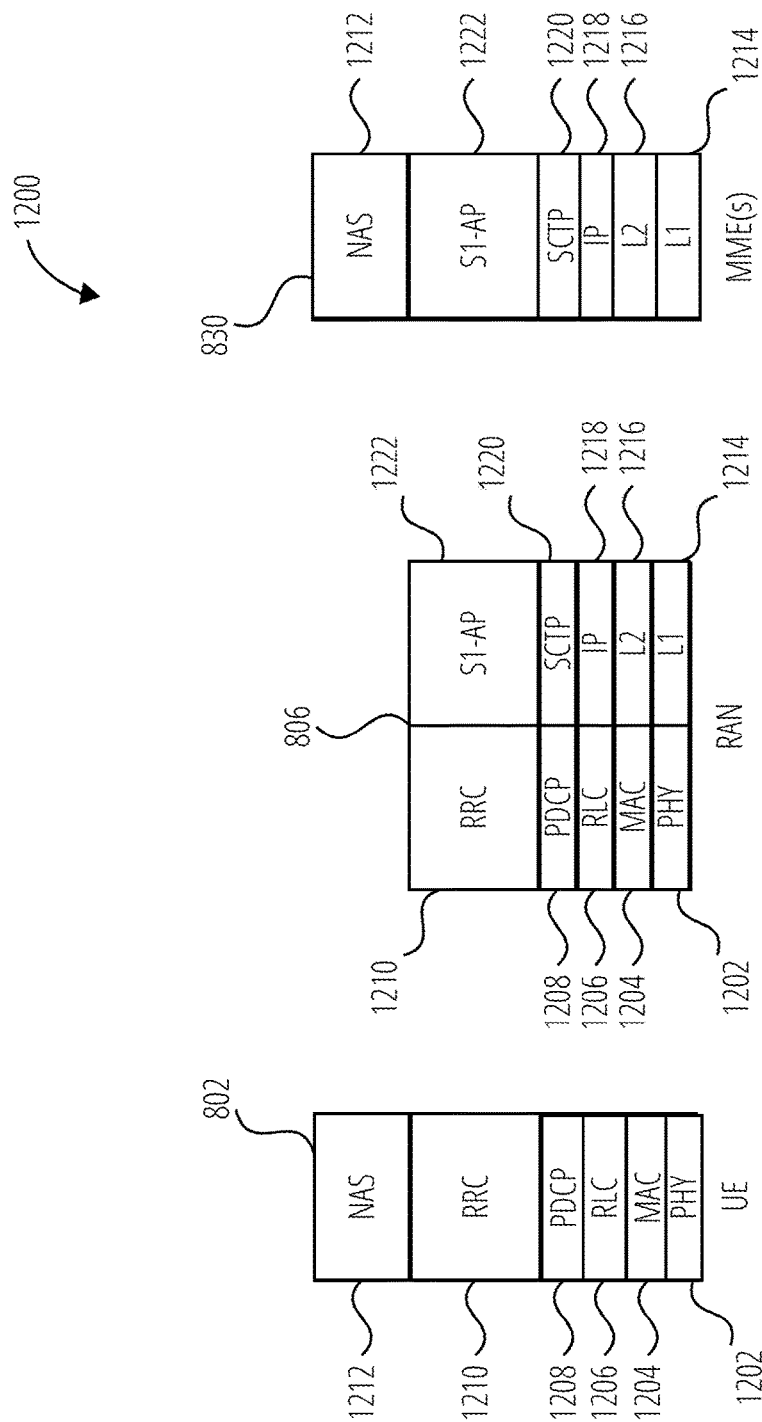
FIG. 12 illustrates a control plane in accordance with one embodiment.

FIG. 12 is an illustration of a control plane protocol stack in accordance with some embodiments. In this embodiment, a control plane 1200 is shown as a communications protocol stack between the UE 802 (or alternatively, the UE 804), the RAN 806 (e.g., the macro RAN node 818 and/or the LP RAN node 820), and the MME(s) 830.

A PHY layer 1202 may transmit or receive information used by the MAC layer 1204 over one or more air interfaces. The PHY layer 1202 may further perform link adaptation or adaptive modulation and coding (AMC), power control, cell search (e.g., for initial synchronization and handover purposes), and other measurements used by higher layers, such as an RRC layer 1210. The PHY layer 1202 may still further perform error detection on the transport channels, forward error correction (FEC) coding/decoding of the transport channels, modulation/demodulation of physical channels, interleaving, rate matching, mapping onto physical channels, and Multiple Input Multiple Output (MIMO) antenna processing.

The MAC layer 1204 may perform mapping between logical channels and transport channels, multiplexing of MAC service data units (SDUs) from one or more logical channels onto transport blocks (TB) to be delivered to PHY via transport channels, de-multiplexing MAC SDUs to one or more logical channels from transport blocks (TB) delivered from the PHY via transport channels, multiplexing MAC SDUs onto TBs, scheduling information reporting, error correction through hybrid automatic repeat request (HARD), and logical channel prioritization.

An RLC layer 1206 may operate in a plurality of modes of operation, including: Transparent Mode (TM), Unacknowledged Mode (UM), and Acknowledged Mode (AM). The RLC layer 1206 may execute transfer of upper layer protocol data units (PDUs), error correction through automatic repeat request (ARQ) for AM data transfers, and concatenation, segmentation and reassembly of RLC SDUs for UM and AM data transfers. The RLC layer 1206 may also execute re-segmentation of RLC data PDUs for AM data transfers, reorder RLC data PDUs for UM and AM data transfers, detect duplicate data for UM and AM data transfers, discard RLC SDUs for UM and AM data transfers, detect protocol errors for AM data transfers, and perform RLC re-establishment.

A PDCP layer 1208 may execute header compression and decompression of IP data, maintain PDCP Sequence Numbers (SNs), perform in-sequence delivery of upper layer PDUs at re-establishment of lower layers, eliminate duplicates of lower layer SDUs at re-establishment of lower layers for radio bearers mapped on RLC AM, cipher and decipher control plane data, perform integrity protection and integrity verification of control plane data, control timer-based discard of data, and perform security operations (e.g., ciphering, deciphering, integrity protection, integrity verification, etc.).

The main services and functions of the RRC layer 1210 may include broadcast of system information (e.g., included in Master Information Blocks (MIBs) or System Information Blocks (SIBs) related to the non-access stratum (NAS)), broadcast of system information related to the access stratum (AS), paging, establishment, maintenance and release of an RRC connection between the UE and E-UTRAN (e.g., RRC connection paging, RRC connection establishment, RRC connection modification, and RRC connection release), establishment, configuration, maintenance and release of point-to-point radio bearers, security functions including key management, inter radio access technology (RAT) mobility, and measurement configuration for UE measurement reporting. Said MIBs and SIBs may comprise one or more information elements (IEs), which may each comprise individual data fields or data structures.

The UE 802 and the RAN 806 may utilize a Uu interface (e.g., an LTE-Uu interface) to exchange control plane data via a protocol stack comprising the PHY layer 1202, the MAC layer 1204, the RLC layer 1206, the PDCP layer 1208, and the RRC layer 1210.

In the embodiment shown, the non-access stratum (NAS) protocols (NAS protocols 1212) form the highest stratum of the control plane between the UE 802 and the MME(s) 830. The NAS protocols 1212 support the mobility of the UE 802 and the session management procedures to establish and maintain IP connectivity between the UE 802 and the P-GW 834.

The S1 Application Protocol (S1-AP) layer (S1-AP layer 1222) may support the functions of the S1 interface and comprise Elementary Procedures (EPs). An EP is a unit of interaction between the RAN 806 and the CN 828. The S1-AP layer services may comprise two groups: UE-associated services and non UE-associated services. These services perform functions including, but not limited to: E-UTRAN Radio Access Bearer (E-RAB) management, UE capability indication, mobility, NAS signaling transport, RAN Information Management (RIM), and configuration transfer.

The Stream Control Transmission Protocol (SCTP) layer (alternatively referred to as the stream control transmission protocol/internet protocol (SCTP/IP) layer) (SCTP layer 1220) may ensure reliable delivery of signaling messages between the RAN 806 and the MME(s) 830 based, in part, on the IP protocol, supported by an IP layer 1218. An L2 layer 1216 and an L1 layer 1214 may refer to communication links (e.g., wired or wireless) used by the RAN node and the MME to exchange information.

The RAN 806 and the MME(s) 830 may utilize an S1-MME interface to exchange control plane data via a protocol stack comprising the L1 layer 1214, the L2 layer 1216, the IP layer 1218, the SCTP layer 1220, and the S1-AP layer 1222.

Figure 13:
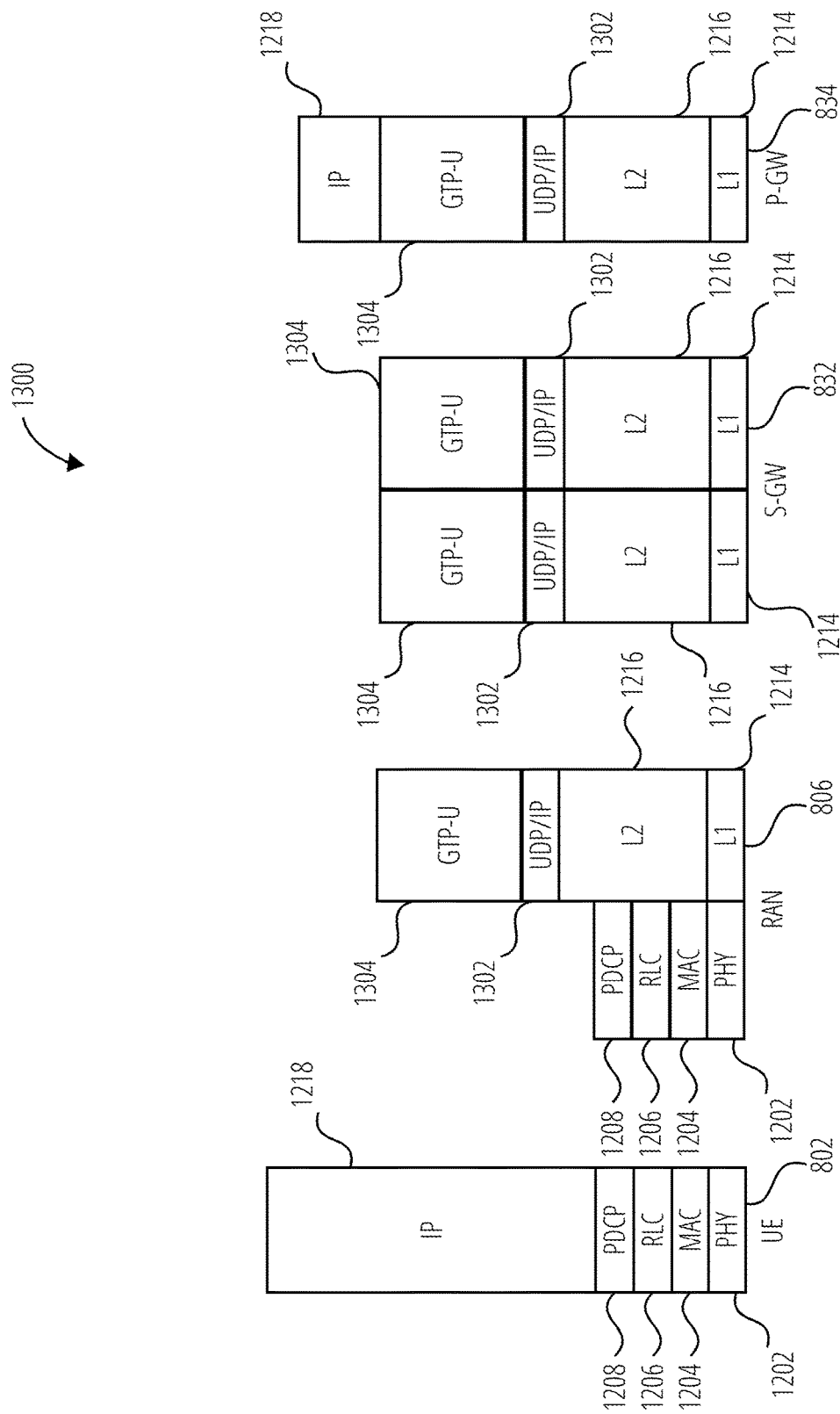
FIG. 13 illustrates a user plane in accordance with one embodiment.

FIG. 13 is an illustration of a user plane protocol stack in accordance with some embodiments. In this embodiment, a user plane 1300 is shown as a communications protocol stack between the UE 802 (or alternatively, the UE 804), the RAN 806 (e.g., the macro RAN node 818 and/or the LP RAN node 820), the S-GW 832, and the P-GW 834. The user plane 1300 may utilize at least some of the same protocol layers as the control plane 1200. For example, the UE 802 and the RAN 806 may utilize a Uu interface (e.g., an LTE-Uu interface) to exchange user plane data via a protocol stack comprising the PHY layer 1202, the MAC layer 1204, the RLC layer 1206, the PDCP layer 1208.

The General Packet Radio Service (GPRS) Tunneling Protocol for the user plane (GTP-U) layer (GTP-U layer 1304) may be used for carrying user data within the GPRS core network and between the radio access network and the core network. The user data transported can be packets in any of IPv4, IPv6, or PPP formats, for example. The UDP and IP security (UDP/IP) layer (UDP/IP layer 1302) may provide checksums for data integrity, port numbers for addressing different functions at the source and destination, and encryption and authentication on the selected data flows. The RAN 806 and the S-GW 832 may utilize an S1-U interface to exchange user plane data via a protocol stack comprising the L1 layer 1214, the L2 layer 1216, the UDP/IP layer 1302, and the GTP-U layer 1304. The S-GW 832 and the P-GW 834 may utilize an S5/S8a interface to exchange user plane data via a protocol stack comprising the L1 layer 1214, the L2 layer 1216, the UDP/IP layer 1302, and the GTP-U layer 1304. As discussed above with respect to FIG. 12, NAS protocols support the mobility of the UE 802 and the session management procedures to establish and maintain IP connectivity between the UE 802 and the P-GW 834.

Figure 14:
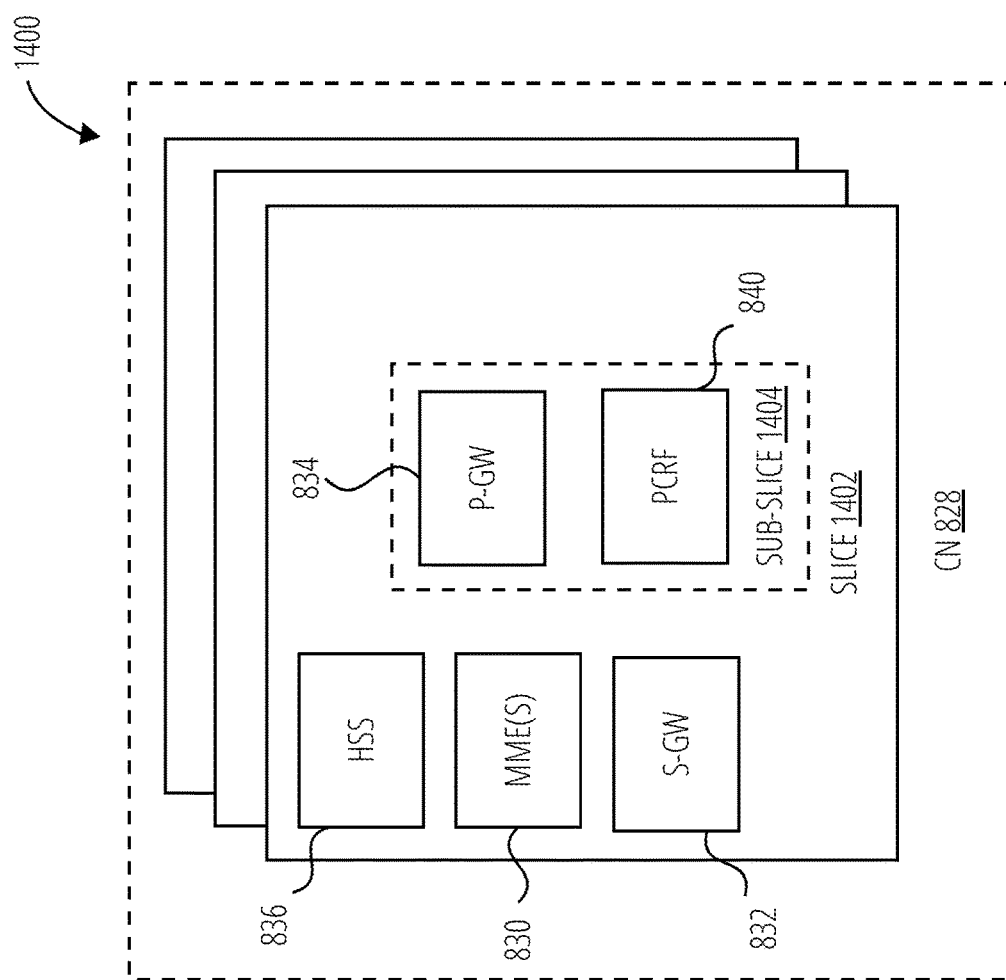
FIG. 14 illustrates a components in accordance with one embodiment.

FIG. 14 illustrates components 1400 of a core network in accordance with some embodiments. The components of the CN 828 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 828 may be referred to as a network slice 1402 (e.g., the network slice 1402 is shown to include the HSS 836, that MME(s) 830, and the S-GW 832). A logical instantiation of a portion of the CN 828 may be referred to as a network sub-slice 1404 (e.g., the network sub-slice 1404 is shown to include the P-GW 834 and the PCRF 840).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 15:
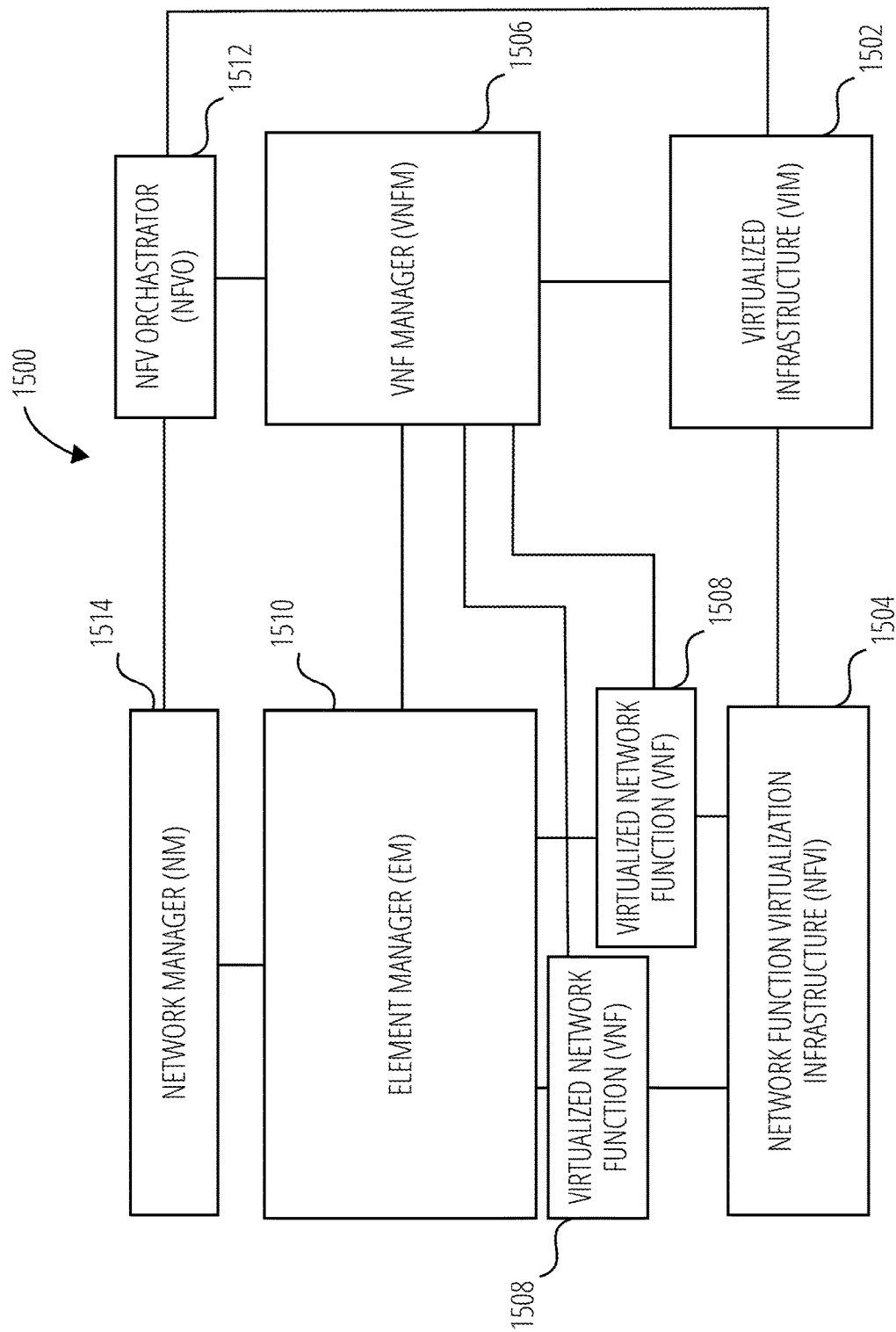
FIG. 15 illustrates a system in accordance with one embodiment.

FIG. 15 is a block diagram illustrating components, according to some example embodiments, of a system 1500 to support NFV. The system 1500 is illustrated as including a virtualized infrastructure manager (shown as VIM 1502), a network function virtualization infrastructure (shown as NFVI 1504), a VNF manager (shown as VNFM 1506), virtualized network functions (shown as VNF 1508), an element manager (shown as EM 1510), an NFV Orchestrator (shown as NFVO 1512), and a network manager (shown as NM 1514).

The VIM 1502 manages the resources of the NFVI 1504. The NFVI 1504 can include physical or virtual resources and applications (including hypervisors) used to execute the system 1500. The VIM 1502 may manage the life cycle of virtual resources with the NFVI 1504 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 1506 may manage the VNF 1508. The VNF 1508 may be used to execute EPC components/functions. The VNFM 1506 may manage the life cycle of the VNF 1508 and track performance, fault and security of the virtual aspects of VNF 1508. The EM 1510 may track the performance, fault and security of the functional aspects of VNF 1508. The tracking data from the VNFM 1506 and the EM 1510 may comprise, for example, performance measurement (PM) data used by the VIM 1502 or the NFVI 1504. Both the VNFM 1506 and the EM 1510 can scale up/down the quantity of VNFs of the system 1500.

The NFVO 1512 may coordinate, authorize, release and engage resources of the NFVI 1504 in order to provide the requested service (e.g., to execute an EPC function, component, or slice). The NM 1514 may provide a package of end-user functions with the responsibility for the management of a network, which may include network elements with VNFs, non-virtualized network functions, or both (management of the VNFs may occur via the EM 1510).

Figure 16:
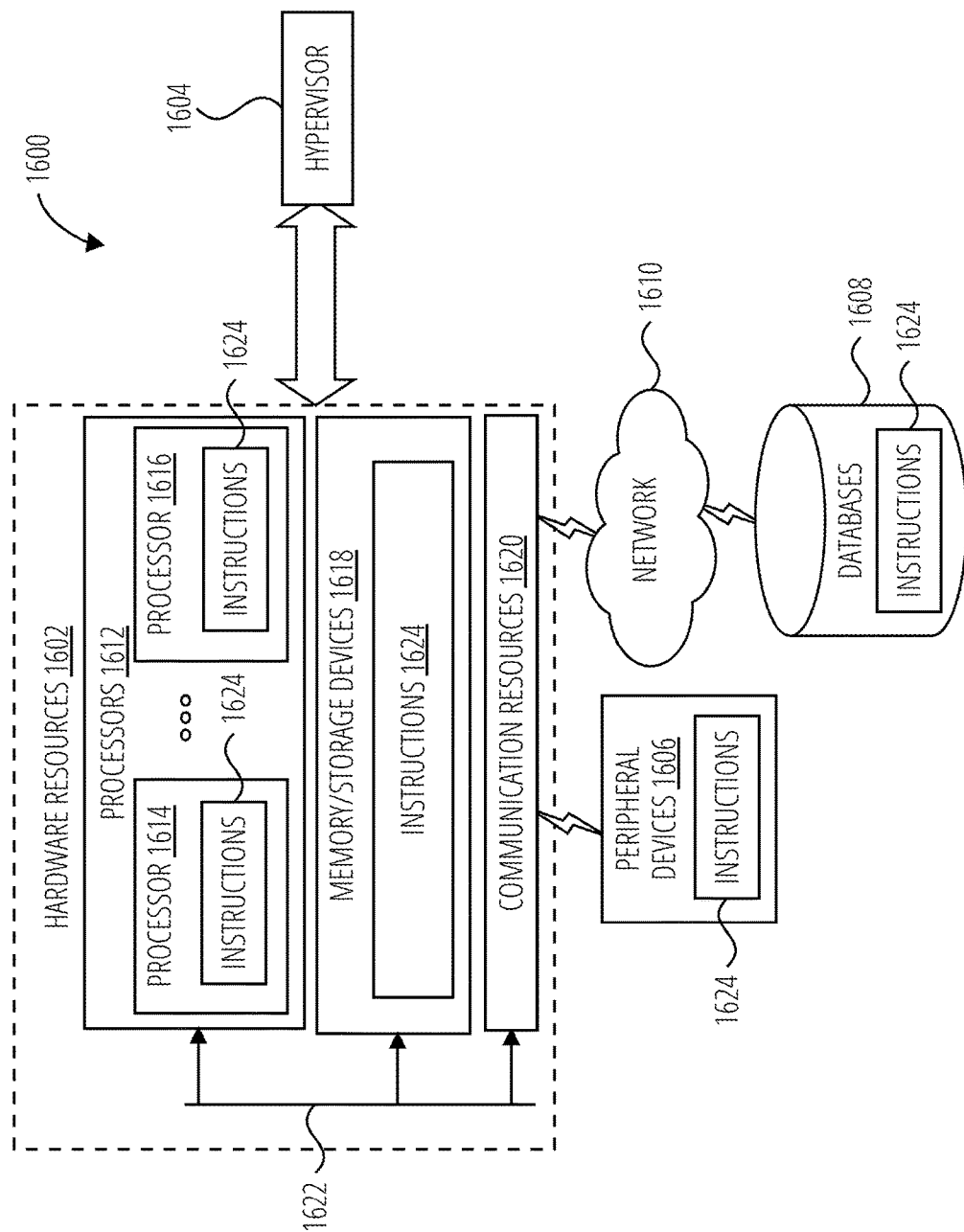
FIG. 16 illustrates a components in accordance with one embodiment.

FIG. 16 is a block diagram illustrating components 1600, according to some example embodiments, able to read instructions from a machine-readable or computer-readable medium (e.g., a non-transitory machine-readable storage medium) and perform any one or more of the methodologies discussed herein. Specifically, FIG. 16 shows a diagrammatic representation of hardware resources 1602 including one or more processors 1612 (or processor cores), one or more memory/storage devices 1618, and one or more communication resources 1620, each of which may be communicatively coupled via a bus 1622. For embodiments where node virtualization (e.g., NFV) is utilized, a hypervisor 1604 may be executed to provide an execution environment for one or more network slices/sub-slices to utilize the hardware resources 1602.

The processors 1612 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1614 and a processor 1616.

The memory/storage devices 1618 may include main memory, disk storage, or any suitable combination thereof. The memory/storage devices 1618 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1620 may include interconnection or network interface components or other suitable devices to communicate with one or more peripheral devices 1606 or one or more databases 1608 via a network 1610. For example, the communication resources 1620 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1624 may comprise software, a program, an application, an applet, an app, or other executable code for causing at least any of the processors 1612 to perform any one or more of the methodologies discussed herein. The instructions 1624 may reside, completely or partially, within at least one of the processors 1612 (e.g., within the processor's cache memory), the memory/storage devices 1618, or any suitable combination thereof. Furthermore, any portion of the instructions 1624 may be transferred to the hardware resources 1602 from any combination of the peripheral devices 1606 or the databases 1608. Accordingly, the memory of the processors 1612, the memory/storage devices 1618, the peripheral devices 1606, and the databases 1608 are examples of computer-readable and machine-readable media.

The following examples pertain to further embodiments.

Example 1A is a method for a management function of a wireless communication system to manage physical network function (PNF) instances in a network service (NS) instance. The method includes sending an update NS request from the management function to a network functions virtualization orchestrator (NFVO) to update the NS instance, the update NS request comprising an NS instance identifier, an update type, and PNF information; receiving an update NS response from the NFVO, the update NS response comprising a lifecycle operation occurrence identifier corresponding to an NS lifecycle operation occurrence; receiving an NS Lifecycle Change notification from the NFVO, the NS Lifecycle Change notification indicating a start of an NS update; and receiving an NS identifier change notification from the NFVO, the NS identifier change notification indicating a result of the NS update.

Example 2A includes the method of Example 1A, wherein the update type is selected from a group comprising an add PNF update operation, a modify PNF update operation, and a remove PNF update operation.

Example 3A is the method of Example 2A, wherein for the add PNF update operation, the PNF information comprises add PNF data for a PNF instance to be added, the add PNF data including at least one of a PNF identifier, a PNF name, a physical network function descriptor (PNFD) identifier related to the PNF instance, a PNF profile identifier, and connection point (CP) data comprising information for an external CP of a PNF.

Example 4A is the method of Example 2A, wherein for the modify PNF update operation, the PNF information comprises modify PNF data for a PNF instance to be modified, the modify PNF data including at least one of a PNF identifier, a PNF name, and connection point (CP) data comprising information for an external CP of a PNF.

Example 5A is the method of Example 2A, wherein for the remove PNF update operation, the PNF information comprises a remove PNF identifier to identify one or more PNF in the NS instance to be removed.

Example 6A is the method of Example 1A, wherein the NS Lifecycle Change notification received from the NFVO comprises an NS Lifecycle Change notification information element including one or more attributes selected from the NS instance identifier, the lifecycle operation occurrence identifier, an operation parameter set to NS update, and a notification type set to indicate a start of NS instantiation.

Example 7A is the method of Example 1A, wherein the NS identifier change notification received from the NFVO comprises an NS Lifecycle Change notification information element including one or more attributes selected from the NS instance identifier, the lifecycle operation occurrence identifier, an operation parameter set to NS update, and a notification type set to indicate an end result of NS instantiation.

Example 8A is the method of Example 1A, further comprising implementing a plurality of core network functions (NFs), and splitting functional features of a radio access network (RAN) into a centralized unit (CU) that implements upper layer functions of a RAN node and a distributed unit (DU) that implements lower layer functions of the RAN node.

Example 9A is the method of Example 8A, further comprising implementing the NFs and the CU functions as virtualized network functions (VNFs) deployed in a cloud network, and implementing the DU as a PNF in vertical hardware deployed in a cell site to provide wireless communication to user equipment (UE).

Example 10A is the method of Example 9A, further comprising implementing an evolved node B (eNB) as the PNF.

Example 11A is the a method for a network functions virtualization orchestrator (NFVO), the method comprising: receiving a request from a management function to update a network service (NS) instance; sending, to the management function, an update NS response comprising a lifecycle operation occurrence identifier corresponding to an NS lifecycle operation occurrence; sending, to the management function, an NS Lifecycle Change notification indicating a start of an NS update; performing a PNF update operation based on the request; and sending, to the management function, an NS identifier change notification indicating a result of the NS update.

Example 12A is the method of Example 11A, wherein the PNF update operation based on the request comprises an add PNF update operation, wherein the request includes add PNF data for a PNF instance to be added, and wherein the add PNF data includes at least one of a PNF identifier, a PNF name, a physical network function descriptor (PNFD) identifier related to the PNF instance, a PNF profile identifier, and connection point (CP) data comprising information for an external CP of a PNF.

Example 13A is the method of Example 11A, wherein the PNF update operation based on the request comprises a modify PNF update operation, wherein the request includes modify PNF data for a PNF instance to be modified, and wherein the modify PNF data includes at least one of a PNF identifier, a PNF name, and connection point (CP) data comprising information for an external CP of a PNF.

Example 14A is the method of Example 11A, wherein the PNF update operation based on the request comprises a remove PNF update operation, and wherein the request includes a remove PNF identifier to identify one or more PNF in the NS instance to be removed.

Example 15A is the method of Example 11A, wherein the NS Lifecycle Change notification comprises an NS Lifecycle Change notification information element including one or more attributes selected from an NS instance identifier, the lifecycle operation occurrence identifier, an operation parameter set to NS update, and a notification type set to indicate a start of NS instantiation.

Example 16A is the method of Example 11A, wherein the NS identifier change notification comprises an NS Lifecycle Change notification information element including one or more attributes selected from an NS instance identifier, the lifecycle operation occurrence identifier, an operation parameter set to NS update, and a notification type set to indicate an end result of NS instantiation.

Example 17A is a non-volatile computer-readable storage medium having computer-readable instructions stored thereon, the computer-readable instructions to, when executed, instruct a processor to: process a request to update a network service (NS) with a physical network function (PNF) instance; process an update NS response comprising a lifecycle operation occurrence identifier corresponding to an NS lifecycle operation occurrence; process an NS Lifecycle Change notification indicating a start of an NS update; and process an NS identifier change notification indicating a result of the NS update.

Example 18A is the non-volatile computer-readable storage medium of Example 17A, wherein the request comprises an NS instance identifier, an update type, and PNF information.

Example 19A is the non-volatile computer-readable storage medium of Example 18A, wherein the update type is selected from a group comprising an add PNF update operation, a modify PNF update operation, and a remove PNF update operation.

Example 20A is the non-volatile computer-readable storage medium of Example 19A, wherein for the add PNF update operation, the PNF information comprises add PNF data for a PNF instance to be added, the add PNF data including at least one of a PNF identifier, a PNF name, a physical network function descriptor (PNFD) identifier related to the PNF instance, a PNF profile identifier, and connection point (CP) data comprising information for an external CP of a PNF.

Example 21A is the non-volatile computer-readable storage medium of Example 19A, wherein for the modify PNF update operation, the PNF information comprises modify PNF data for a PNF instance to be modified, the modify PNF data including at least one of a PNF identifier, a PNF name, and connection point (CP) data comprising information for an external CP of a PNF.

Example 22A is the non-volatile computer-readable storage medium of Example 19A, wherein for the remove PNF update operation, the PNF information comprises a remove PNF identifier to identify one or more PNF in the NS instance to be removed.

Example 23A is the non-volatile computer-readable storage medium of Example 18A, wherein the NS Lifecycle Change notification comprises an NS Lifecycle Change notification information element including one or more attributes selected from the NS instance identifier, the lifecycle operation occurrence identifier, an operation parameter set to NS update, and a notification type set to indicate a start of NS instantiation.

Example 24A is the non-volatile computer-readable storage medium of Example 18A, wherein the NS identifier change notification comprises an NS Lifecycle Change notification information element including one or more attributes selected from the NS instance identifier, the lifecycle operation occurrence identifier, an operation parameter set to NS update, and a notification type set to indicate an end result of NS instantiation.

Example 25A is a computing apparatus, the computing apparatus comprising a processor and a memory storing instructions. The processor and the memory storing instructions that, when executed by the processor, configure the apparatus to: send an update NS request from the management function to a network functions virtualization orchestrator (NFVO) to update the NS instance, the update NS request comprising an NS instance identifier, an update type, and PNF information; receive an update NS response from the NFVO, the update NS response comprising a lifecycle operation occurrence identifier corresponding to an NS lifecycle operation occurrence; receive an NS Lifecycle Change notification from the NFVO, the NS Lifecycle Change notification indicating a start of an NS update; and receive an NS identifier change notification from the NFVO, the NS identifier change notification indicating a result of the NS update.

Example 26A is a non-transitory computer-readable storage medium, the computer-readable storage medium including instructions that when executed by a computer, cause the computer to: send an update NS request from the management function to a network functions virtualization orchestrator (NFVO) to update the NS instance, the update NS request comprising an NS instance identifier, an update type, and PNF information; receive an update NS response from the NFVO, the update NS response comprising a lifecycle operation occurrence identifier corresponding to an NS lifecycle operation occurrence; receive an NS Lifecycle Change notification from the NFVO, the NS Lifecycle Change notification indicating a start of an NS update; and receive an NS identifier change notification from the NFVO, the NS identifier change notification indicating a result of the NS update.

Example 27A is a computing apparatus, the computing apparatus comprising a processor and a memory storing instructions. The processor and the memory storing instructions that, when executed by the processor, configure the apparatus to: receive a request from a management function to update a network service (NS) instance; send, to the management function, an update NS response comprising a lifecycle operation occurrence identifier corresponding to an NS lifecycle operation occurrence; send, to the management function, an NS Lifecycle Change notification indicating a start of an NS update; perform a PNF update operation based on the request; and send, to the management function, an NS identifier change notification indicating a result of the NS update.

Example 28A is a non-transitory computer-readable storage medium, the computer-readable storage medium including instructions that when executed by a computer, cause the computer to: receive a request from a management function to update a network service (NS) instance; send, to the management function, an update NS response comprising a lifecycle operation occurrence identifier corresponding to an NS lifecycle operation occurrence; send, to the management function, an NS Lifecycle Change notification indicating a start of an NS update; perform a PNF update operation based on the request; and send, to the management function, an NS identifier change notification indicating a result of the NS update.

Example 29A is a computing apparatus including a processor and a memory storing instructions that, when executed by the processor, configure the apparatus to perform the method of any of Examples 1A-16A.

Example 30A is a non-transitory computer-readable storage medium including instructions that, when processed by a computer, configure the computer to perform the method of any of Examples 1A-16A.

Example 31A is an apparatus comprising means to perform the method of any of Examples 1A-16A.

Example 1B may include an apparatus, comprising: a 5G network may consist of 5G core NFs (network Functions) (e.g. UPF, SMF, NSSF, NEF, etc.), and NG RAN where the functional split feature (see TR 38.801) splits a gNB (Next Generation radio access network) into gNB-CU (Centralized Unit) that implements the upper layer functions of gNB and gNB-DU (distributed unit) that implements the lower layer functions of gNB.

Example 2B may include the apparatus of Example 1B and/or some other Examples herein, wherein 5G core NFs and gNB-CU may be implemented as VNF (Virtualized network Functions) deployed in the cloud, and gNB-DU may be implemented as PNF (Physical network Function) in the vertical hardware deployed in the cell site to provide wireless communication to UE.

Example 3B may include an NMF comprising one or more processors is configured to: send a request to NFVO to update the NS with the parameters: nsInstanceId—the identifier of the NS instance being updated; and updateType="AddPnf" to indicate the type of update operation; and addPnfData—the information of the PNF to be added: receive from NFVO the operation result containing the lifecycle operation occurrence identifier; and receive from NFVO the NS Lifecycle Change notification to NM indicating the start of NS update; and receive from NFVO the NS Lifecycle Change notification to NM indicating the result of NS update.

Example 4B may include the NMF Example 3B and/or some other Examples herein, wherein the addPnfData contains: pnfId: the identifier of the PNF; and pnfdId: reference to the identifier of the PNFD related to this PNF; and pnfProfileId: reference to the identifier of the PNF Profile to be used for this PNF; and cpData: information of the external CP (Connection Point) of the PNF.

Example 5B may include the NMF Example 3B and/or some other Examples herein, wherein NFVO comprising one or more processors is configured to: receive a request from NMF to update the NS; and send to NMF the NS update operation result containing the lifecycle operation occurrence identifier; and send to NMF the NS Lifecycle Change notification to NM indicating the start of NS update; and add the PNF identified by pnfId to the NS instance identified by nsInstanceId; and send from NFVO the NS Lifecycle Change notification to NM indicating the result of NS update.

Example 6B may include an NMF comprising one or more processors is configured to: send a request to NFVO to update the NS with the parameters: nsInstanceId—the identifier of the NS instance being updated; and updateType="ModifyPnf" to indicate the type of update operation; and modifyPnfData—the information of the PNF to be used for modification; receive from NFVO the operation result containing the lifecycle operation occurrence identifier; and receive from NFVO the NS Lifecycle Change notification to NM indicating the start of NS update; and receive from NFVO the NS Lifecycle Change notification to NM indicating the result of NS update.

Example 7B may include the NMF Example 6B and/or some other Examples herein, wherein the modifyPnfData contains: pnfId: the identifier of the PNF; and cpData: information of the external CP (Connection Point) of the PNF.

Example 8B may include the NMF Example 6B and/or some other Examples herein, wherein NFVO comprising one or more processors is configured to: receive a request from NMF to update the NS; and send to NMF the NS update operation result containing the lifecycle operation occurrence identifier; and send to NMF the NS Lifecycle Change notification to NM indicating the start of NS update; and modify the PNF identified by pnfId in the NS instance identified by nsInstanceId with the modifyPnfData information; and send from NFVO the NS Lifecycle Change notification to NM indicating the result of NS update.

Example 9B may include an NMF comprising one or more processors is configured to: send a request to NFVO to update the NS with the parameters: nsInstanceId—the identifier of the NS instance being updated; and updateType="RemovePnf" to indicate the type of update operation; and removePnfId—the identifier of the PNF(s) in the NS instance that are to be removed; receive from NFVO the operation result containing the lifecycle operation occurrence identifier; and receive from NFVO the NS Lifecycle Change notification to NM indicating the start of NS update; and receive from NFVO the NS Lifecycle Change notification to NM indicating the result of NS update.

Example 10B may include the NMF Example 9B and/or some other Examples herein, wherein NFVO comprising one or more processors is configured to: receive a request from NMF to update the NS; and send to NMF the NS update operation result containing the lifecycle operation occurrence identifier; and send to NMF the NS Lifecycle Change notification to NM indicating the start of NS update; and remove the PNF identified by pnfId from the NS instance identified by nsInstanceId with the modifyPnfData information; and send from NFVO the NS Lifecycle Change notification to NM indicating the result of NS update.

Example 11B may include the NMF Example 2B and/or some other Examples herein, wherein the 4G eNB can be implemented as a PNF.

Example 12B may include an apparatus comprising means to perform one or more elements of a method described in or related to any of Examples 1B-11B, or any other method or process described herein.

Example 13B may include one or more non-transitory computer-readable media comprising instructions to cause an electronic device, upon execution of the instructions by one or more processors of the electronic device, to perform one or more elements of a method described in or related to any of Examples 1B-11B, or any other method or process described herein.

Example 14B may include an apparatus comprising logic, modules, or circuitry to perform one or more elements of a method described in or related to any of Examples 1B-11B, or any other method or process described herein.

Example 15B may include a method, technique, or process as described in or related to any of Examples 1B-11B, or portions or parts thereof.

Example 16B may include an apparatus comprising: one or more processors and one or more computer readable media comprising instructions that, when executed by the one or more processors, cause the one or more processors to perform the method, techniques, or process as described in or related to any of Examples 1B-11B, or portions thereof.

Example 17B may include a signal as described in or related to any of Examples 1B-11B, or portions or parts thereof.

Example 18B may include a signal in a wireless network as shown and described herein.

Example 19B may include a method of communicating in a wireless network as shown and described herein.

Example 20B may include a system for providing wireless communication as shown and described herein.

Example 21B may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may include other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device (s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

What is claimed is:

1. An apparatus for a management function of a wireless communication system to manage physical network function (PNF) instances in a network service (NS) instance, the apparatus comprising:

a memory interface to send or receive, to or from a memory device, an update NS request; and a processor to:
generate an update NS request to send from the management function to a network functions virtualization orchestrator (NFVO) to update the NS instance, the update NS request comprising an NS instance identifier, an update type, and PNF information;

process an update NS response from the NFVO, the update NS response comprising a lifecycle operation occurrence identifier corresponding to an NS lifecycle operation occurrence;

process an NS Lifecycle Change notification from the NFVO, the NS Lifecycle Change notification indicating a start of an NS update; and process an NS identifier change notification from the NFVO, the NS identifier change notification indicating a result of the NS update.

2. The apparatus of claim 1, wherein the update type is selected from a group comprising an add PNF update operation, a modify PNF update operation, and a remove PNF update operation.

3. The apparatus of claim 2, wherein for the add PNF update operation, the PNF information comprises add PNF data for a PNF instance to be added, the add PNF data including at least one of a PNF identifier, a PNF name, a physical network function descriptor (PNFD) identifier related to the PNF instance, a PNF profile identifier, and connection point (CP) data comprising information for an external CP of a PNF.

4. The apparatus of claim 2, wherein for the modify PNF update operation, the PNF information comprises modify PNF data for a PNF instance to be modified, the modify PNF data including at least one of a PNF identifier, a PNF name, and connection point (CP) data comprising information for an external CP of a PNF.

5. The apparatus of claim 2, wherein for the remove PNF update operation, the PNF information comprises a remove PNF identifier to identify one or more PNF in the NS instance to be removed.

6. The apparatus of claim 1, wherein the NS Lifecycle Change notification from the NFVO comprises an NS Lifecycle Change notification information element including one or more attributes selected from the NS instance identifier, the lifecycle operation occurrence identifier, an operation parameter set to NS update, and a notification type set to indicate a start of NS instantiation.

7. The apparatus of claim 1, wherein the NS identifier change notification from the NFVO comprises an NS Lifecycle Change notification information element including one or more attributes selected from the NS instance identifier, the lifecycle operation occurrence identifier, an operation parameter set to NS update, and a notification type set to indicate an end result of NS instantiation.

8. The apparatus of claim 1, wherein the processor is further to implement a plurality of core network functions (NFs), and splitting functional features of a radio access network (RAN) into a centralized unit (CU) that implements upper layer functions of a RAN node and a distributed unit (DU) that implements lower layer functions of the RAN node.

9. The apparatus of claim 8, wherein the processor is further to implement the NFs and the CU functions as virtualized network functions (VNFs) deployed in a cloud network, and implementing the DU as a PNF in vertical hardware deployed in a cell site to provide wireless communication to user equipment (UE).

10. The apparatus of claim 9, the processor is further to implement an evolved node B (eNB) as the PNF.

11. A method for a network functions virtualization orchestrator (NFVO), the method comprising:
receiving a request from a management function to update a network service (NS) instance;
sending, to the management function, an update NS response comprising a lifecycle operation occurrence identifier corresponding to an NS lifecycle operation occurrence;
sending, to the management function, an NS Lifecycle Change notification indicating a start of an NS update;
performing a physical network function (PNF) update operation based on the request; and
sending, to the management function, an NS identifier change notification indicating a result of the NS update.

12. The method of claim 11, wherein the PNF update operation based on the request comprises an add PNF update operation, wherein the request includes add PNF data for a PNF instance to be added, and wherein the add PNF data includes at least one of a PNF identifier, a PNF name, a physical network function descriptor (PNFD) identifier related to the PNF instance, a PNF profile identifier, and connection point (CP) data comprising information for an external CP of a PNF.

13. The method of claim 11, wherein the PNF update operation based on the request comprises a modify PNF update operation, wherein the request includes modify PNF data for a PNF instance to be modified, and wherein the modify PNF data includes at least one of a PNF identifier, a PNF name, and connection point (CP) data comprising information for an external CP of a PNF.

14. The method of claim 11, wherein the PNF update operation based on the request comprises a remove PNF update operation, and wherein the request includes a remove PNF identifier to identify one or more PNF in the NS instance to be removed.

15. The method of claim 11, wherein the NS Lifecycle Change notification comprises an NS Lifecycle Change notification information element including one or more attributes selected from an NS instance identifier, the lifecycle operation occurrence identifier, an operation parameter set to NS update, and a notification type set to indicate a start of NS instantiation.

16. The method of claim 11, wherein the NS identifier change notification comprises an NS Lifecycle Change notification information element including one or more attributes selected from an NS instance identifier, the lifecycle operation occurrence identifier, an operation parameter set to NS update, and a notification type set to indicate an end result of NS instantiation.

17. A non-transitory computer-readable storage medium having computer-readable instructions stored thereon, the computer-readable instructions to, when executed, instruct a processor to:
process a request to update a network service (NS) with a physical network function (PNF) instance;
process an update NS response comprising a lifecycle operation occurrence identifier corresponding to an NS lifecycle operation occurrence;
process an NS Lifecycle Change notification indicating a start of an NS update; and
process an NS identifier change notification indicating a result of the NS update.

18. The non-transitory computer-readable storage medium of claim 17, wherein the request comprises an NS instance identifier, an update type, and PNF information.

19. The non-transitory computer-readable storage medium of claim 18, wherein the update type is selected from a group comprising an add PNF update operation, a modify PNF update operation, and a remove PNF update operation.

20. The non-transitory computer-readable storage medium of claim 19, wherein for the add PNF update operation, the PNF information comprises add PNF data for a PNF instance to be added, the add PNF data including at least one of a PNF identifier, a PNF name, a physical network function descriptor (PNFD) identifier related to the PNF instance, a PNF profile identifier, and connection point (CP) data comprising information for an external CP of a PNF.

21. The non-transitory computer-readable storage medium of claim 19, wherein for the modify PNF update operation, the PNF information comprises modify PNF data for a PNF instance to be modified, the modify PNF data including at least one of a PNF identifier, a PNF name, and connection point (CP) data comprising information for an external CP of a PNF.

22. The non-transitory computer-readable storage medium of claim 19, wherein for the remove PNF update operation, the PNF information comprises a remove PNF identifier to identify one or more PNF in the NS instance to be removed.

23. The non-transitory computer-readable storage medium of claim 18, wherein the NS Lifecycle Change notification comprises an NS Lifecycle Change notification information element including one or more attributes selected from the NS instance identifier, the lifecycle operation occurrence identifier, an operation parameter set to NS update, and a notification type set to indicate a start of NS instantiation.

24. The non-transitory computer-readable storage medium of claim 18, wherein the NS identifier change notification comprises an NS Lifecycle Change notification information element including one or more attributes selected from the NS instance identifier, the lifecycle operation occurrence identifier, an operation parameter set to NS update, and a notification type set to indicate an end result of NS instantiation.

* * * * *